(12) United States Patent
Kim et al.

(10) Patent No.: US 12,579,480 B2
(45) Date of Patent: Mar. 17, 2026

(54) SYSTEMS AND METHODS TO GENERATE DATA MESSAGES INDICATING A PROBABILITY OF EXECUTION FOR DATA TRANSACTION OBJECTS USING MACHINE LEARNING

(71) Applicant: Nasdaq, Inc., New York, NY (US)

(72) Inventors: Keon Shik Kim, Cambridge, MA (US); Josep Puig Ruiz, Boston, MA (US); Douglas Hamilton, Boston, MA (US)

(73) Assignee: Nasdaq, Inc., New York, NY (US)

( * ) Notice: Subject to any disclaimer, the term of this patent is extended or adjusted under 35 U.S.C. 154(b) by 714 days.

(21) Appl. No.: 17/955,640

(22) Filed: Sep. 29, 2022

(65) Prior Publication Data

US 2023/0095016 A1 Mar. 30, 2023

Related U.S. Application Data

(60) Provisional application No. 63/250,450, filed on Sep. 30, 2021.

(51) Int. Cl.
*G06N 20/00* (2019.01)
*G06F 18/231* (2023.01)
(Continued)

(52) U.S. Cl.
CPC ........... *G06N 20/20* (2019.01); *G06F 18/231* (2023.01); *G06F 18/2321* (2023.01); *G06N 3/02* (2013.01);
(Continued)

(58) Field of Classification Search
CPC .......... G06N 20/20; G06N 20/10; G06N 3/02; G06N 3/08; G06N 3/126; G06N 3/088;
(Continued)

(56) References Cited

U.S. PATENT DOCUMENTS 10,262,271 B1 * 4/2019 Doddi .................... G06N 5/022
11,410,111 B1 * 8/2022 Washam ............... G06N 20/00
(Continued)

FOREIGN PATENT DOCUMENTS

CN 110807543 2/2020
EP 3620982 3/2020
(Continued)

OTHER PUBLICATIONS

Warren Landis, et al., "Towards High Performance Stock Market Prediction methods", 2020 IEEE Cloud Summit, pp. 156-160.*
(Continued)

*Primary Examiner* — Srirama Channavajjala
(74) *Attorney, Agent, or Firm* — NIXON & VANDERHYE P.C.

(57) ABSTRACT

A computer system includes a transceiver that receives over a data communications network different types of input data and multiple data transaction objects from multiple source nodes. A pre-processor processes the different types of input data and the data transaction objects to generate an input data structure. Based on the input data structure, one or more predictive machine learning models is trained and used to predict a probability of execution of each of the data transaction objects at a future execution time. Output data messages are then generated for transmission by the transceiver over the data communications network indicating the probability of execution for at least one of the data transaction objects at the future execution time.

21 Claims, 15 Drawing Sheets

(51) Int. Cl.

| | |
|---|---|
| *G06F 18/2321* | (2023.01) |
| *G06N 3/00* | (2023.01) |
| *G06N 3/02* | (2006.01) |
| *G06N 3/08* | (2023.01) |
| *G06N 3/088* | (2023.01) |
| *G06N 3/126* | (2023.01) |
| *G06N 7/01* | (2023.01) |
| *G06N 20/10* | (2019.01) |
| *G06N 20/20* | (2019.01) |
| *H04L 41/16* | (2022.01) |

(52) U.S. Cl.

CPC .............. *G06N 3/08* (2013.01); *G06N 3/088* (2013.01); *G06N 3/126* (2013.01); *G06N 7/01* (2023.01); *G06N 20/10* (2019.01); *H04L 41/16* (2013.01)

(58) Field of Classification Search

CPC ........ G06N 7/01; G06N 7/005; G06F 18/231; G06F 18/23213; G06F 18/24323; H04L 41/16

See application file for complete search history.

(56) References Cited

U.S. PATENT DOCUMENTS

| | | | |
|---|---|---|---|
| 11,526,817 B1 * | 12/2022 | Pacheco Mendez | .... G08G 5/22 |
| 11,609,788 B2 | 3/2023 | Cella | |
| 11,922,217 B2 | 3/2024 | Chen et al. | |
| 12,282,803 B2 | 4/2025 | Chen et al. | |
| 12,293,412 B1 | 5/2025 | Jang | |
| 2009/0024546 A1 | 1/2009 | Ficcaglia et al. | |
| 2010/0205120 A1 * | 8/2010 | Zou | ......................... G06F 18/40 |
| | | | 704/250 |
| 2011/0004509 A1 | 1/2011 | Wu et al. | |
| 2012/0215751 A1 | 8/2012 | Broll et al. | |
| 2015/0161549 A1 | 6/2015 | Modarresi | |
| 2017/0109821 A1 | 4/2017 | Carroll | |
| 2019/0102799 A1 | 4/2019 | Kwizera et al. | |
| 2019/0121867 A1 | 4/2019 | Misra | |
| 2019/0303783 A1 * | 10/2019 | Utsumi | .................... G06N 7/00 |

| | | | |
|---|---|---|---|
| 2020/0012933 A1 * | 1/2020 | Truong | ................... G06F 16/93 |
| 2020/0104178 A1 | 4/2020 | Cella | |
| 2020/0151743 A1 | 5/2020 | Acriche et al. | |
| 2020/0250606 A1 | 8/2020 | Moorthy et al. | |
| 2020/0364279 A1 | 11/2020 | Pal et al. | |
| 2020/0364791 A1 * | 11/2020 | Taylor | ................... G06Q 40/04 |
| 2020/0387565 A1 * | 12/2020 | Caglar | ................... G06N 3/082 |
| 2021/0012363 A1 | 1/2021 | Masuda | |
| 2021/0027320 A1 | 1/2021 | Schwenkler | |
| 2022/0012624 A1 * | 1/2022 | Ladurini | ............. G05D 1/0221 |
| 2022/0261575 A1 | 8/2022 | Ogawa | |
| 2022/0300821 A1 * | 9/2022 | Wang | ................... G06F 9/3885 |
| 2023/0049418 A1 * | 2/2023 | Saha | ................... G06N 3/0464 |
| 2023/0334515 A1 | 10/2023 | Togawa | |

FOREIGN PATENT DOCUMENTS

| | | | |
|---|---|---|---|
| WO | WO2019204355 A1 * | 10/2019 | |
| WO | WO2021126272 A1 * | 6/2021 | |

OTHER PUBLICATIONS

M. Nabipour et al., "Deep Learning for Stock Market Prediction", Entropy 2020, Published: Jul. 30, 2020 pp. 1-23.*

International Search Report and Written Opinion of the International Searching Authority for PCT/US2022/045149 mailed Jan. 31, 2023, 12 pages.

International Preliminary Report on Patentability for PCT/US2022/045149 mailed Jun. 12, 2024, 25 pages.

U.S. Appl. No. 17/968,215, filed Oct. 18, 2022, Kim et al.

U.S. Appl. No. 19/182,723, filed Apr. 18, 2025, Chen et al.

International Search Report and Written Opinion of the International Searching Authority for PCT/US2021/055551 mailed Jan. 21, 2022, 19 pages.

Office Action for EP Application No. 21892547.7 dated Sep. 13, 2024, 10 pages.

Office Action dated Feb. 7, 2025 for U.S. Appl. No. 17/968,215, 29 pages.

Final Office Action dated Sep. 3, 2025 for U.S. Appl. No. 17/968,215, 35 pages.

Advisory Action dated Oct. 31, 2025 for U.S. Appl. No. 17/968,215, 5 pages.

\* cited by examiner

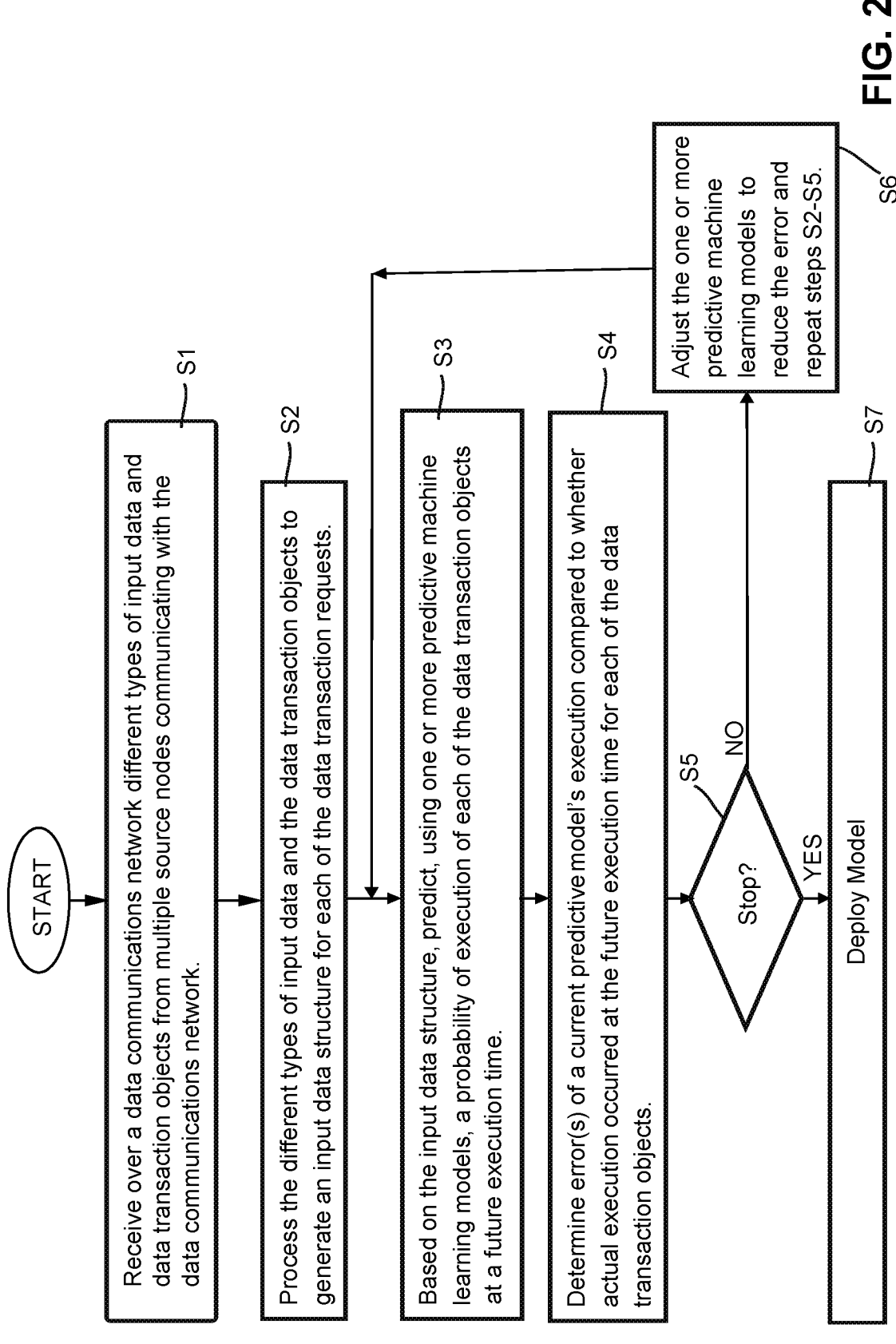

FIG. 2

START

Receive over a data communications network different types of input data and data transaction objects from multiple source nodes communicating with the data communications network. — S1

Process the different types of input data and the data transaction objects to generate an input data structure for each of the data transaction requests. — S2

Based on the input data structure, predict, using one or more predictive machine learning models, a probability of execution of each of the data transaction objects at a future execution time. — S3

Determine error(s) of a current predictive model's execution compared to whether actual execution occurred at the future execution time for each of the data transaction objects. — S4

Stop? — S5

Adjust the one or more predictive machine learning models to reduce the error and repeat steps S2-S5. — S6

NO

YES

Deploy Model — S7

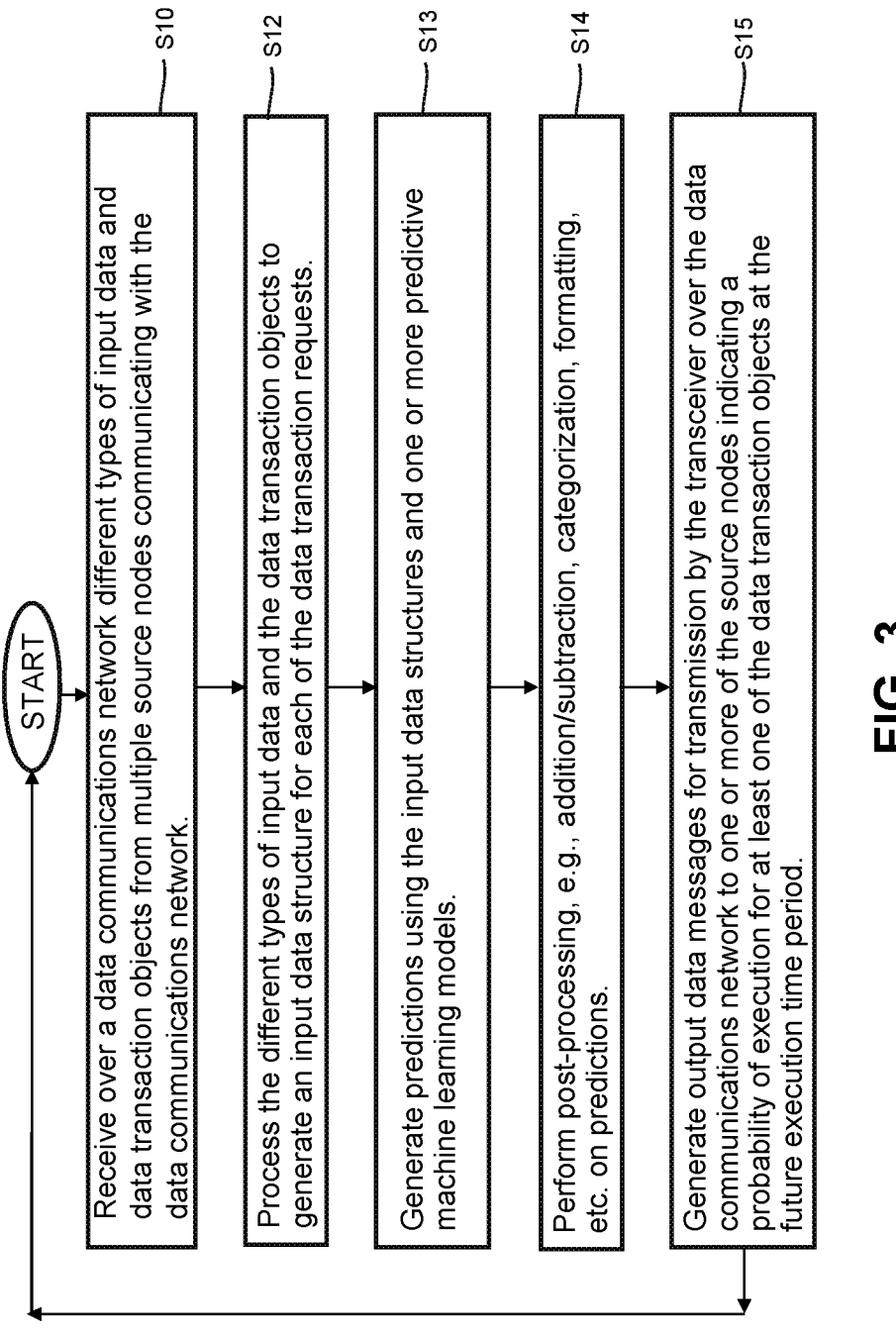

START

Receive over a data communications network different types of input data and data transaction objects from multiple source nodes communicating with the data communications network. — S10

Process the different types of input data and the data transaction objects to generate an input data structure for each of the data transaction requests. — S12

Generate predictions using the input data structures and one or more predictive machine learning models. — S13

Perform post-processing, e.g., addition/subtraction, categorization, formatting, etc. on predictions. — S14

Generate output data messages for transmission by the transceiver over the data communications network to one or more of the source nodes indicating a probability of execution for at least one of the data transaction objects at the future execution time period. — S15

FIG. 3

Model Prediction: Real-Time

FIG. 6

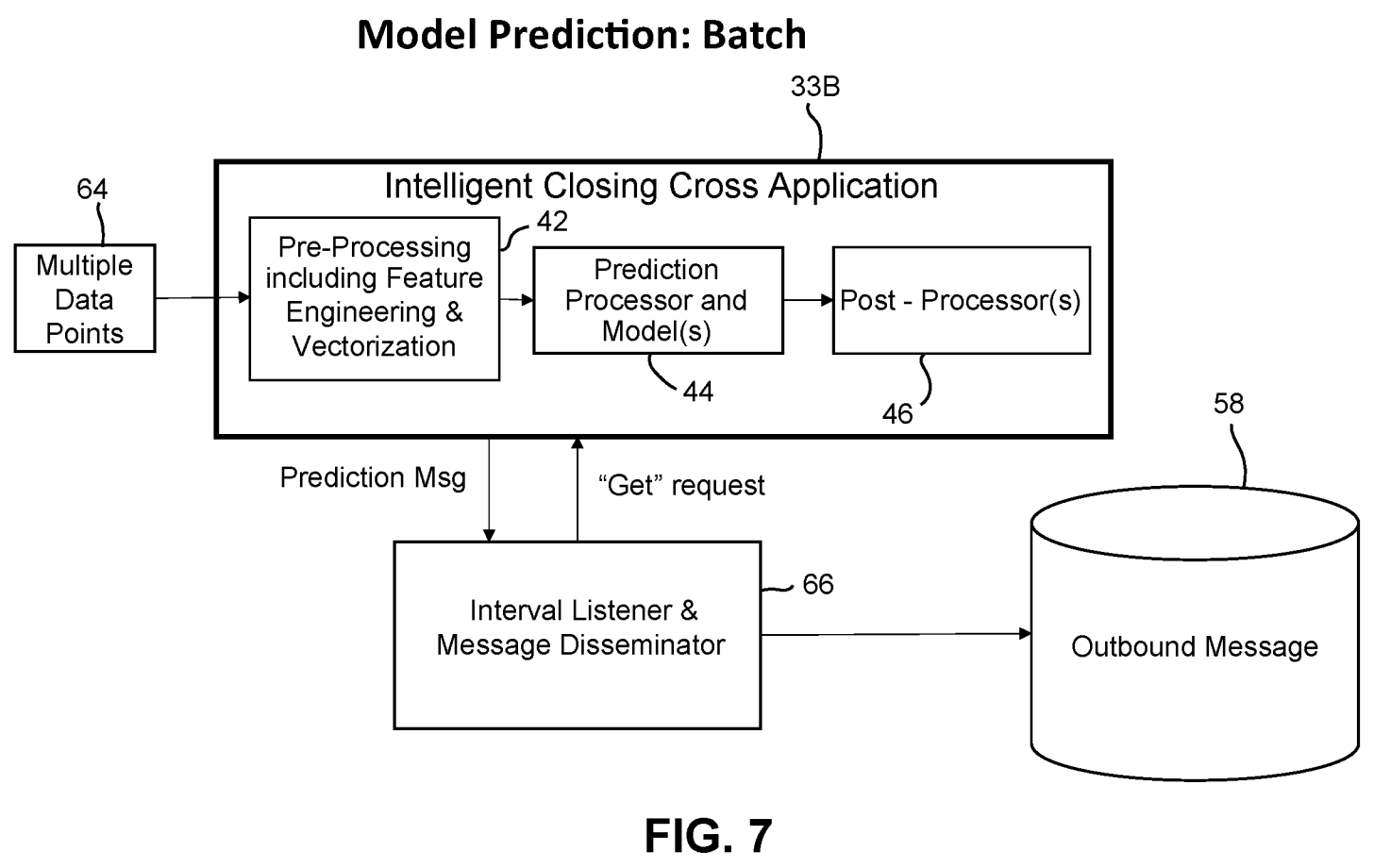

Model Prediction: Batch

Intelligent Closing Cross Application — 33B

Multiple Data Points — 64

Pre-Processing including Feature Engineering & Vectorization — 42

Prediction Processor and Model(s) — 44

Post - Processor(s) — 46

Prediction Msg

"Get" request

Interval Listener & Message Disseminator — 66

Outbound Message — 58

FIG. 7

Feed Aggregation

74 — Prediction

76 — Sort [e.g., by Price, Size, Symbol, Time, Order Side, etc.]

78 — Tabular Feed

Data for Prediction (Batch)

| Time (nanoseconds) | Order Size | Order Price | Buy | Distribution Statistics of Orders | | | | | | | | | | | | | | |
|---|---|---|---|---|---|---|---|---|---|---|---|---|---|---|---|---|---|---|
| 575250527735859 | 614 | 194.50 | 0 | -0.00010 | 2145.04469 | 5221.27737 | 5107.2432 | 0.000000 | 16.80436 | 1100 | 3100 | 804 | 710 | 3599385.0 | 4253613.0 | 94 | 199.34 | -0.292681 |
| 552001122239526 | 100 | 409.42 | 1 | 0.00004 | 149.656410 | 335.657197 | 809.65389 | 13.33376 | 0.000000 | 100 | 100 | 102 | 95 | 29183.0 | 34118.0 | 164 | 412.27 | -0.129142 |
| 552001479239576 | 200 | 58.58 | 1 | 0.00153 | 733.228235 | 2364.93354 | 2867.13059 | 1.469941 | 0.000000 | 400 | 400 | 238 | 237 | 311622.0 | 343671.0 | 104 | 57.33 | -0.270088 |
| 372019717691576 | 80 | 41.70 | 0 | 0.00000 | 424.550388 | 2096.77495 | 726.911079 | 0.000000 | 2.160160 | 80 | 80 | 115 | 114 | 54767.0 | 27729.0 | 112 | 40.0 | 0.972424 |
| 575998136181569 | 24563 | 20.37 | 0 | 0.00000 | 2311.41983 | 8865.94542 | 19059.7916 | 0.655088 | 0.000000 | 4200 | 26797 | 110 | 59 | 1701205.0 | 1705920.0 | 36 | 20.89 | -0.369950 |

FIG. 13

Output (Batch)

AAPL

| | | Ask | | | | | Bid | | | | |
|---|---|---|---|---|---|---|---|---|---|---|---|
| | Order Size | 10 | 50 | 100 | 500 | 1,000 | 10 | 50 | 100 | 500 | 1,000 |
| 3:56:49 pm Price | $100.02 | 80% | 85% | 83% | 71% | 70% | 59% | 55% | 54% | 49% | 41% |
| | $100.01 | 75% | 72% | 71% | 70% | 67% | 64% | 63% | 59% | 51% | 49% |
| | $100.00 | 72% | 75% | 70% | 66% | 60% | 70% | 69% | 62% | 61% | 54% |
| | $99.99 | 67% | 62% | 61% | 60% | 55% | 71% | 70% | 67% | 65% | 59% |
| | $99.98 | 56% | 55% | 50% | 43% | 40% | 76% | 75% | 70% | 69% | 64% |
| 3:56:50 pm Price | $100.02 | 79% | 78% | 76% | 74% | 72% | 59% | 55% | 54% | 49% | 41% |
| | $100.01 | 77% | 76% | 71% | 70% | 67% | 64% | 63% | 59% | 51% | 49% |
| | $100.00 | 75% | 75% | 68% | 66% | 64% | 70% | 69% | 62% | 61% | 54% |
| | $99.99 | 73% | 70% | 67% | 65% | 59% | 71% | 70% | 67% | 65% | 59% |
| | $99.98 | 69% | 68% | 63% | 60% | 57% | 76% | 75% | 70% | 69% | 64% |

FIG. 14A

AAPL

| Order side | | BUY (minimum price) | | | | | | SELL (maximum price) | | | | | |
|---|---|---|---|---|---|---|---|---|---|---|---|---|---|
| Order type | | LOC | | | IO | | | LOC | | | IO | | |
| Order size | | 100 | 1,000 | 10,000 | 100 | 1,000 | 10,000 | 100 | 1,000 | 10,000 | 100 | 1,000 | 10,000 |
| 3:56:49 p.m. | 75% | 129.48 | 129.50 | 129.51 | 129.47 | 129.50 | 129.51 | 129.47 | 129.45 | 129.42 | | | |
| | 90% | 129.53 | 129.57 | 129.61 | 129.47 | 129.51 | 129.54 | 129.44 | 129.42 | 129.41 | | | |
| | 95% | 129.57 | 129.59 | 129.63 | 129.48 | 129.51 | 129.54 | 129.42 | 129.38 | 129.36 | | | |
| | 99.97% | 129.60 | 129.62 | 129.65 | 129.49 | 129.52 | 129.54 | 129.38 | 129.36 | 129.33 | | | |
| 3:56:50 p.m. | 75% | 129.48 | 129.52 | 129.56 | 129.47 | 129.50 | 129.53 | 129.47 | 129.43 | 129.42 | | | |
| | 90% | 129.52 | 129.53 | 129.56 | 129.48 | 129.50 | 129.53 | 129.45 | 129.41 | 129.37 | | | |
| | 95% | 129.53 | 129.58 | 129.59 | 129.50 | 129.52 | 129.53 | 129.42 | 129.39 | 129.36 | | | |
| | 99.97% | 129.55 | 129.60 | 129.62 | 129.50 | 129.52 | 129.56 | 129.41 | 129.39 | 129.36 | | | |

Symbol: AAPL

FIG. 14B

SYSTEMS AND METHODS TO GENERATE DATA MESSAGES INDICATING A PROBABILITY OF EXECUTION FOR DATA TRANSACTION OBJECTS USING MACHINE LEARNING

CROSS REFERENCE(S) TO RELATED APPLICATION(S)

This application claims the benefit of and priority to U.S. Provisional Application No. 63/250,450, filed Sep. 30, 2021, the entire contents being incorporated herein by reference.

TECHNICAL FIELD

The technology described herein relates to distributed computing systems.

INTRODUCTION

Many modern computer systems and platforms must process enormous amounts of data for each of many possible, diverse data transaction objects. Computer systems have limited data processing and data storage resources including limited data processing speed and capacity, memory storage, power, and throughput over data communication networks. Each data transaction object may having many associated variables and/or parameters. Further, each variable and/or parameter may have a wide range of values. Depending on a host of complex factors, many data transaction objects that are processed are ultimately not executed by the computer system at a desired execution time because one or more of their corresponding associated variables and/or parameters is not satisfied at that time. Whether a data transaction object will be executed is not known prior to the desired execution time.

So one technical problem is wasting data processing time and other end user resources processing large numbers of data transaction objects that are unlikely to be executed.

Another technical challenge is how to reliably predict which data transaction objects are more likely to execute at the desired execution time. In other words, a challenge is how to efficiently and accurately identify a subset of data transaction objects that have a high probability of execution and/or being of significant interest to end users so that computer system resources can be optimally allocated to that subset of data transaction objects.

An additional problem is that many computer systems function in a rapidly changing environment where data transaction objects and parameters change. Thus, a further technical challenge is to rapidly and accurately respond to those types of changes.

More generally, there is a technical challenge of how to optimize allocation of limited computing resources in complex data processing applications where the data processing environment changes and perhaps quite rapidly.

Accordingly, it will be appreciated that new and improved techniques, systems, and processes are continually sought after in these and other areas of technology to address these technical problems and challenges.

SUMMARY

A computer system includes a transceiver that receives over a data communications network different types of input data and multiple data transaction objects from multiple source nodes communicating with the data communications network. A processing system processes the different types of input data and the data transaction objects to generate an input data structure for each of the data transaction objects. Based on the input data structure, one or more predictive machine learning models is trained and used to predict a probability of execution of each of the data transaction objects at a future execution time. Output data messages are then generated for transmission by the transceiver over the data communications network indicating the probability of execution for at least one of the data transaction objects at the future execution time.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which:

FIG. 2 is a flowchart showing example computer-implemented procedures for training one or more predictive machine learning models according to certain example embodiments;

FIG. 3 is a flowchart showing example computer-implemented procedures for using one or more predictive machine learning models according to certain example embodiments;

Figure 6:
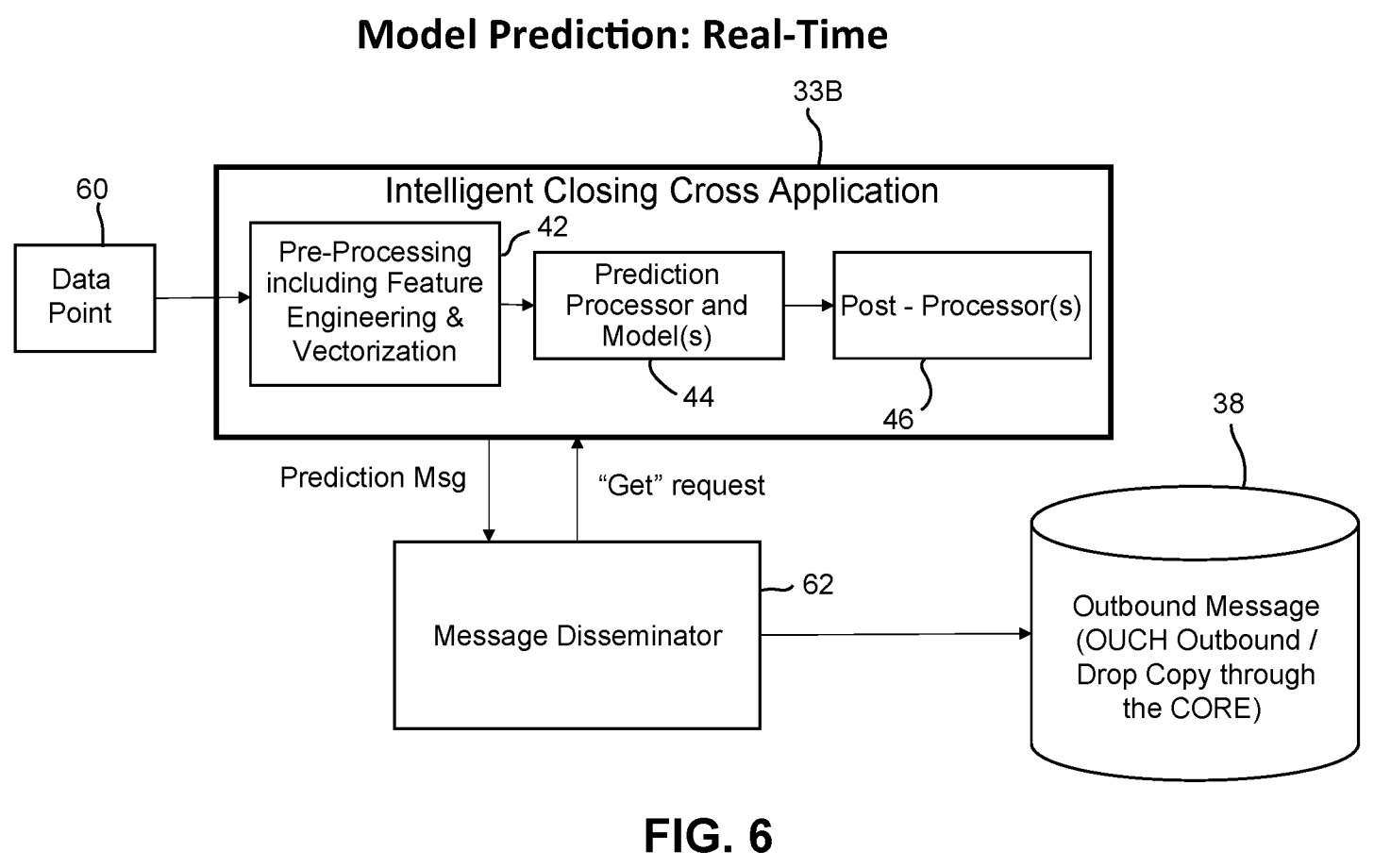

FIG. 6 is a system diagram showing an example real-time/asynchronous implementation of an example application to an electronic trading platform;

FIG. 7 is a system diagram showing an example batch implementation of an example application to an electronic trading platform;

FIG. 13 is a diagram illustrating specific example of a batch of orders for prediction according to example embodiments;

FIGS. 14A and 14B are charts illustrating two specific examples for batch prediction outputs according to example embodiments.

DETAILED DESCRIPTION

Figure 1:
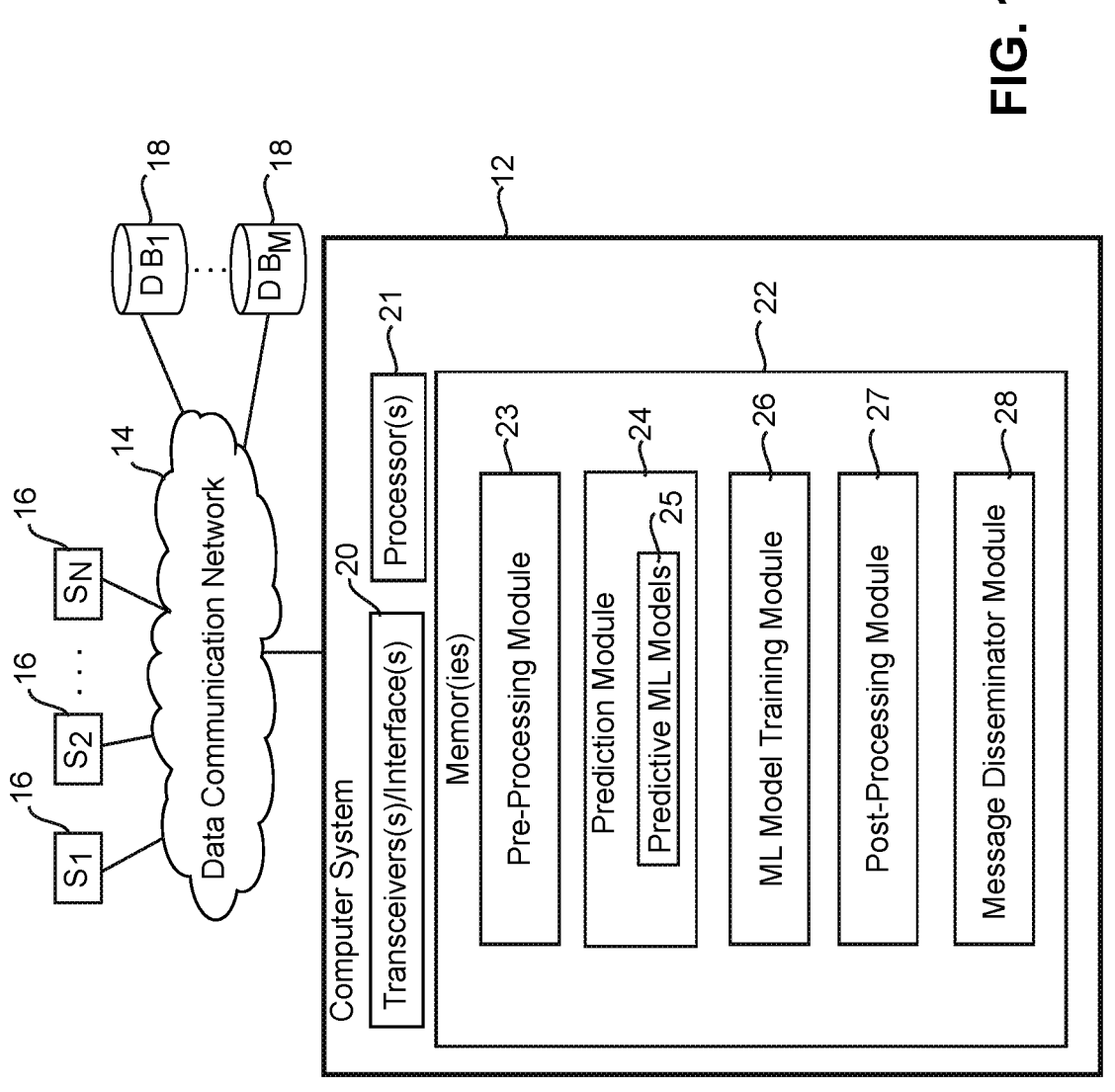
FIG. 1 is an example computer system diagram according to certain example embodiments.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

Some embodiments described herein relate to distributed computing systems and techniques for implementing distributed processing on such systems. Examples of distributed computing systems include telecommunication networks, payment processing systems, industrial control systems, parallel scientific computation systems, distributed databases, blockchain-based smart contracts systems, electronic trading platforms, and others. Many distributed computing systems are configured to process messages that they receive. In particular, many distributed computing systems are configured to receive and process data transaction objects and other types of objects, which specify in some fashion operations for the distributed computing system to perform or, in some instances, to perform upon the satisfaction of certain conditions. A data transaction object relates to operation(s) that the distributed computing system is requested to perform that change of some kind of state in the distributed computing system. As an example, a parallel scientific computation system may receive a data transaction object that specifies some operations to be performed in parallel; as another example, a distributed database system may receive a data transaction object that specifies a data operation (e.g., the addition, update, or removal of some data) that should be performed on the data store managed by the database system. Processing performed in a distributed computing system is often handled by different modules that are distributed among the computing resources within the overall distributed computing system.

As noted above, one example type of distributed computing system is an electronic trading platform. In many implementations, an electronic trading platform includes (a) one or more modules for receiving data transaction request objects, (b) one or more modules for transmitting data from the electronic trading platform to recipient systems (via e.g., "data feeds" or "electronic data feeds"), and (c) a matching engine, for performing data processing based on the data transaction request objects received by the electronic trading platform.

A data transaction request object received by an electronic trading platform may indicate, for example, a request to enter an order (e.g., an electronic order) to buy or sell a particular asset that is traded on the platform. An electronic trading platform may be configured to handle (i.e., may be programmed to perform operations for) different types of orders, with each type of order having its own associated set of data attributes and expected behaviors.

The distributed a computer system described herein can predict a probability of execution for data transaction objects at a future execution time using machine learning. For the electronic trading platform example, a probability of execution for trade orders at a future closing cross auction time is predicted using machine learning. This reduces expending distributed computing resources on data transaction objects, e.g., trade orders, that are unlikely to execute at the future execution time, e.g., at a future closing cross auction time, and also allows computing resources to be more effectively directed towards data transaction objects having higher probabilities of execution at the future execution time, e.g., trade orders with a higher probability of being traded at the future closing cross auction.

Figure 15:
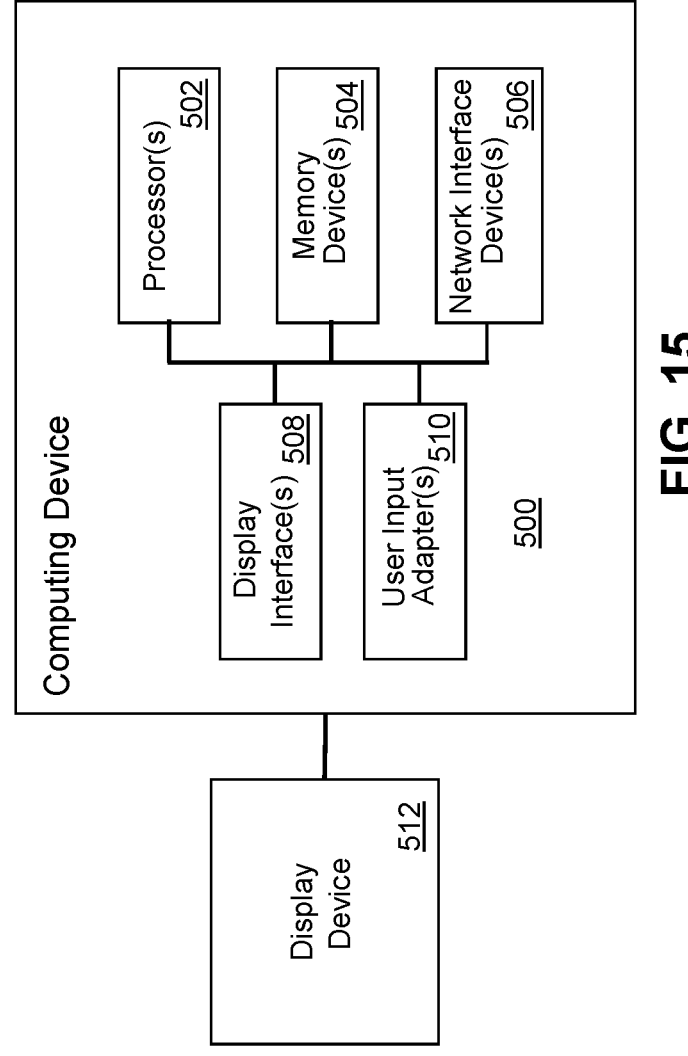
FIG. 15 shows an example computing system that may be used in some embodiments to implement features described herein.

Certain example embodiments relate to a computer system that includes a transceiver to receive over a data communications network different types of input data relating to each of multiple data transaction objects received from multiple source nodes and a processing system including at least one hardware processor (e.g., the computing device 500 shown in FIG. 15). The computer system processes the different types of input data and the data transaction objects to generate an input data structure for each of the data transaction objects. Based on the input data structure, one or more predictive machine learning models is trained and used to predict a probability of execution of each of the data transaction objects at a future execution time. Output data messages are then generated for transmission by the transceiver over the data communications network indicating the probability of execution for at least one of the data transaction objects at the future execution time.

The computer system trains the one or more predictive machine learning models by adding a base predictive model with a further predictive model to generate a current base predictive model. This training process repeats until one or more predetermined criteria is met, e.g., the errors are below a predetermined error threshold or reach a predetermined number of repetitions or if the decrease in error falls below a threshold signaling that further substantial improvement of the model is unlikely. Retraining may also be performed after the initial training, e.g., to try to improve performance, to adapt to new conditions, situations, inputs, data transaction objects, etc.

Although predictive machine learning models are described in detailed examples, those skilled in the art will appreciate that other prediction technologies using artificial intelligence (AI) and machine learning may be used to generate the predictions.

The technological improvements offered by the technology described in this application can be applied in different domains, such as for example electronic trading platforms, message routing optimization in data networks, some supply chain delivery problems, etc. Thus, the technology may be applied to any domain that requires resource allocation and/or optimization.

In example embodiments relating to electronic trading platforms, "intelligent" opening and/or closing cross trade order execution predictions are sent to client devices. One example implementation provides real-time predictions and another example implementation provides batch predictions. The description provides a detailed intelligent closing cross application example that demonstrates how very large amounts of data may be analyzed for each of many possible data transaction objects, e.g., trade requests in the example application, to identify a subset of those data transaction objects, e.g., trade requests, that merit processing resources because they have a higher probability of being executed a future execution time, e.g., at a closing cross auction. That subset of data transaction objects and each data transaction object's corresponding probability of execution, e.g., trader orders with a predicted high likelihood of execution at closing cross, are of significant interest to end users. The advantageous results include less data communicated over data communication networks to end users and lower consumption of other computer system resources like memory storage capacity, data processing capacity, and power. In addition, the computer system performance is improved in terms of faster processing speed, faster data communication speed, lower power consumption, and the like.

Another technical advantage of the technology described herein is that the computer system functions well in and adapts to a rapidly changing environment where data categories, data objects, variable and parameter values, and the relationships between the data objects and the categories change. The computer system monitors and identifies such changes and adapts the computer system, e.g., by retraining the predictive machine learning models at predetermined retraining intervals.

Figure 4:
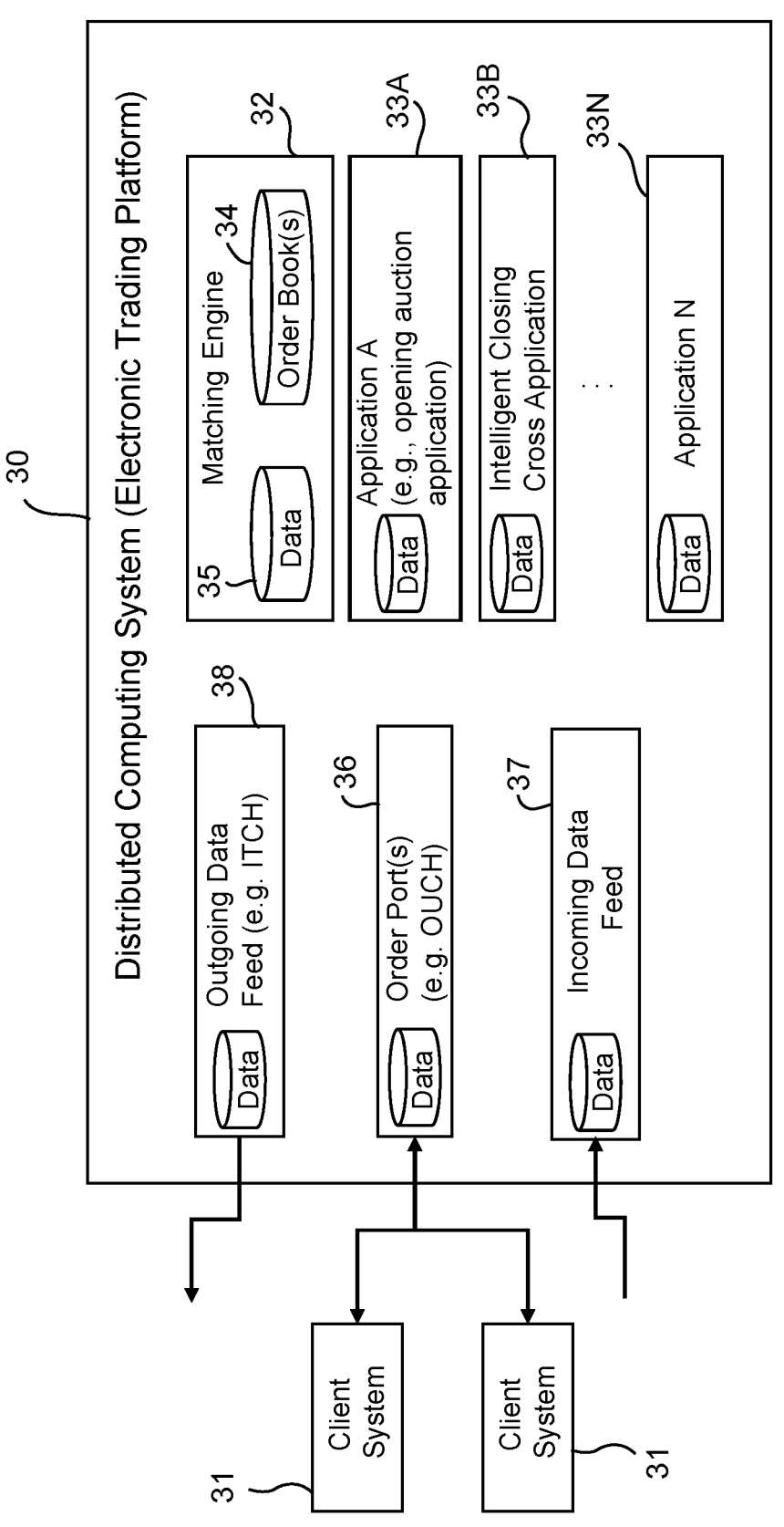
FIG. 4 illustrates a system diagram showing a distributed computing system corresponding to an electronic trading platform that can be used in certain example embodiments.
Figure 5:
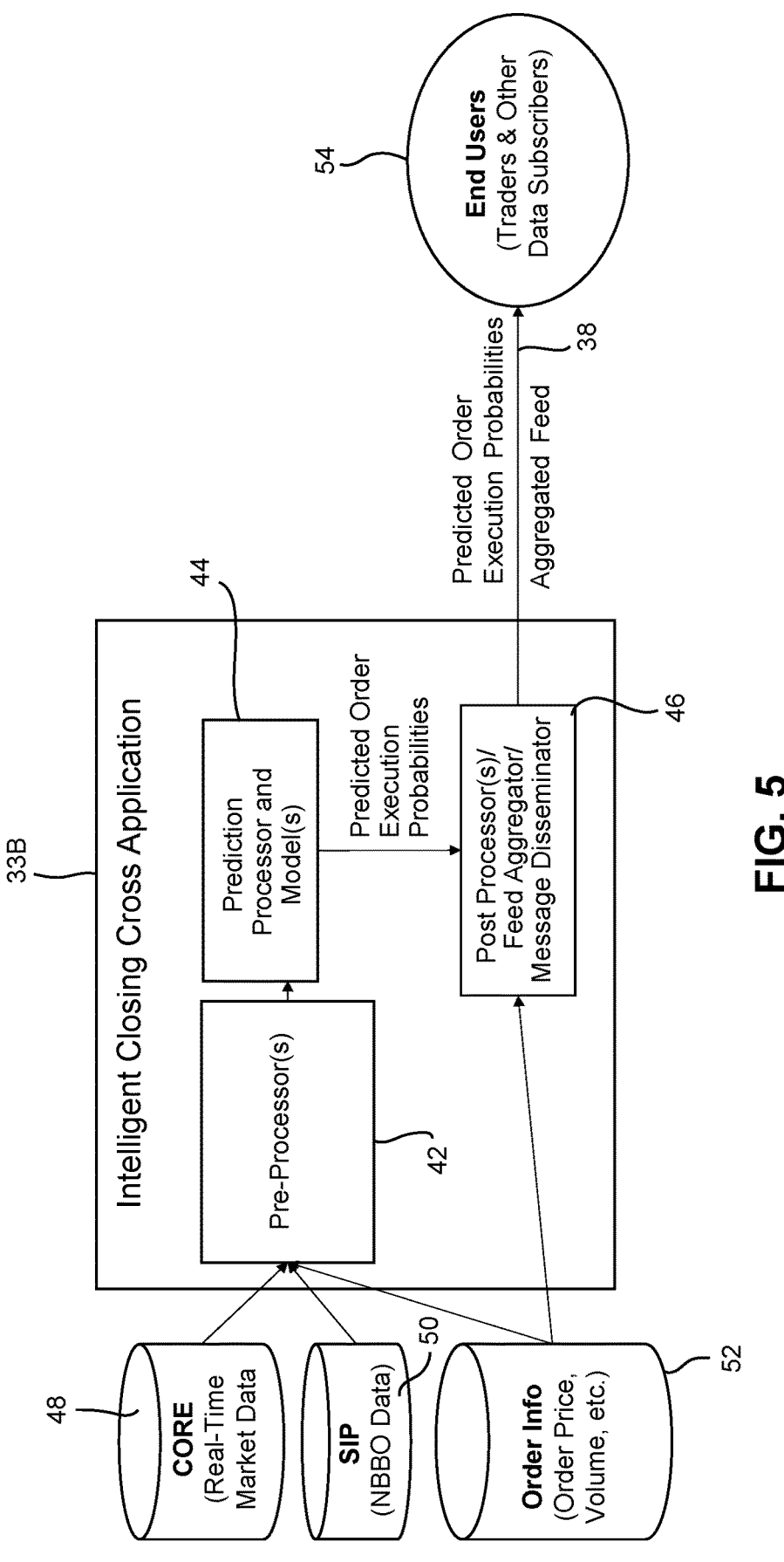
FIG. 5 illustrates a system diagram showing data communications between various computer, data storage, and end user entities in an example application operating on the electronic trading platform in FIG. 4 according to certain example closing cross auction embodiments.
Figure 8:
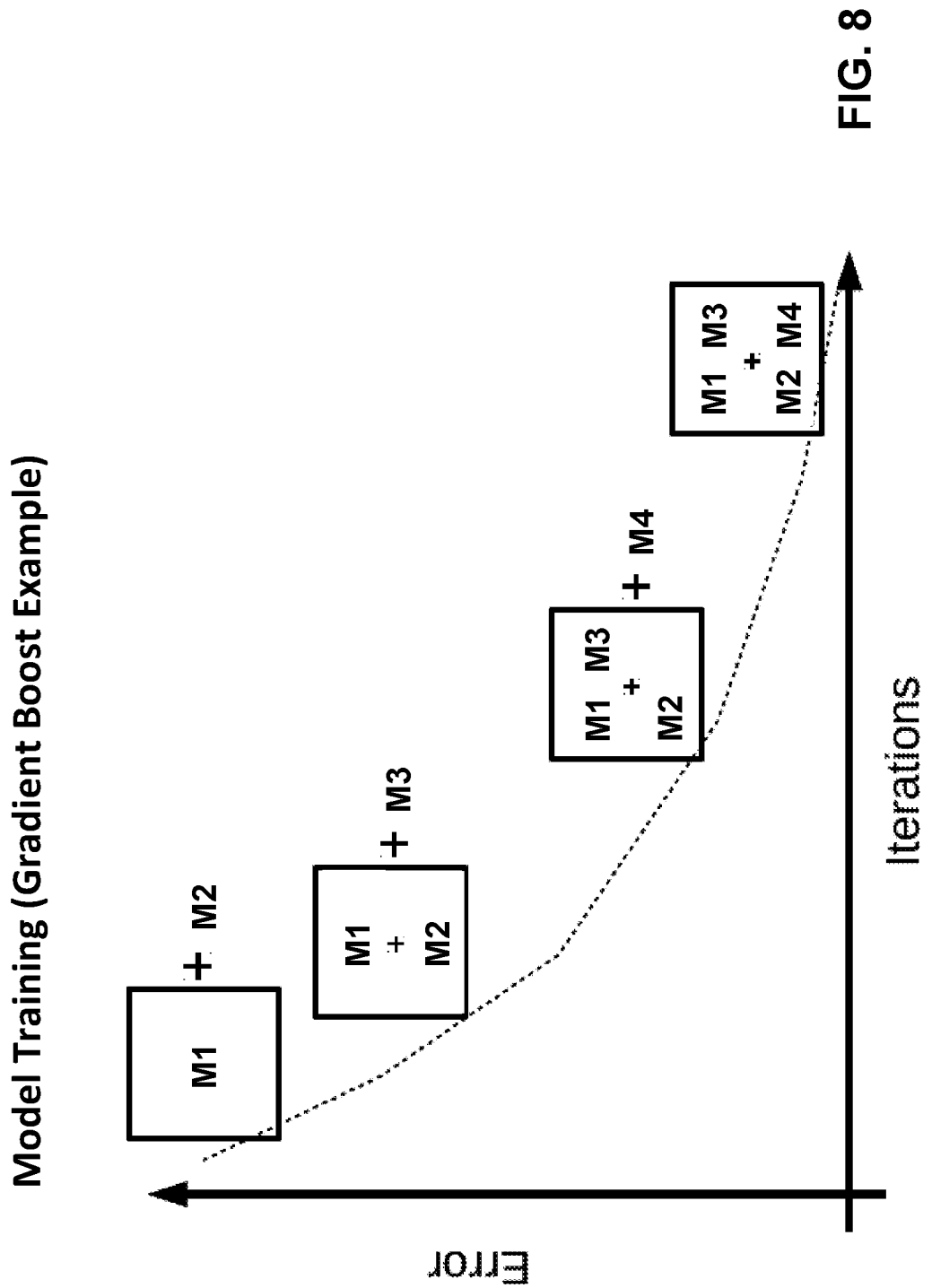
FIG. 8 is a diagram illustrating an example of predictive machine learning model training according to example embodiments.
Figure 9:
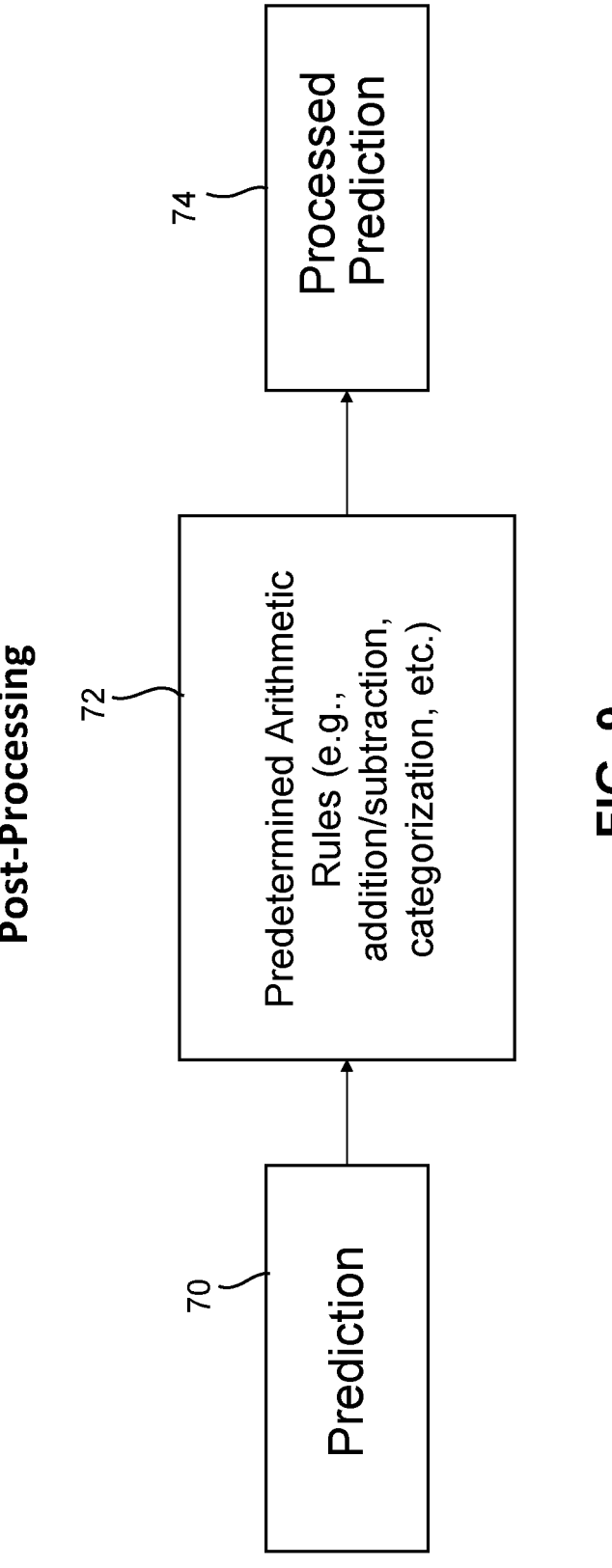
FIG. 9 is a diagram illustrating an example implementation of post processing for the system of FIG. 5 according to example embodiments.
Figure 10:
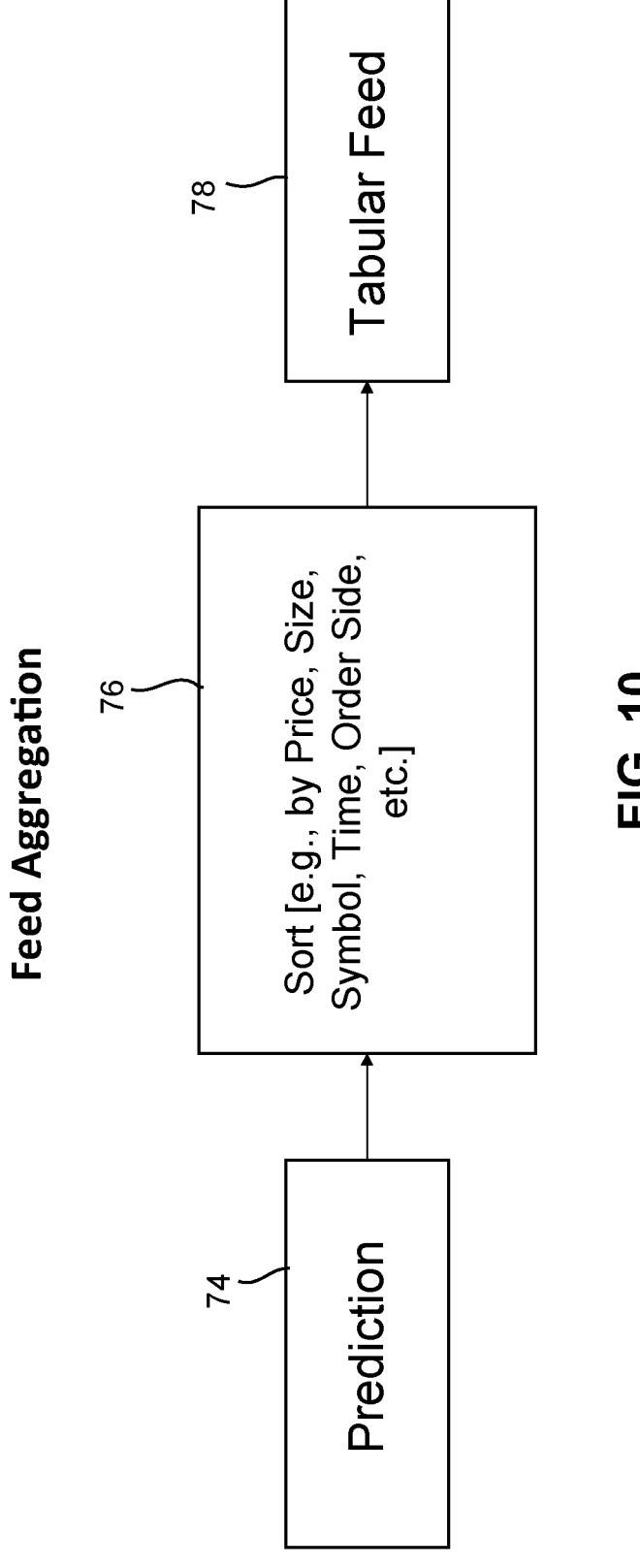
FIG. 10 is a diagram illustrating an example implementation of feed aggregation for the system of FIG. 5 according to example embodiments.
Figure 11:
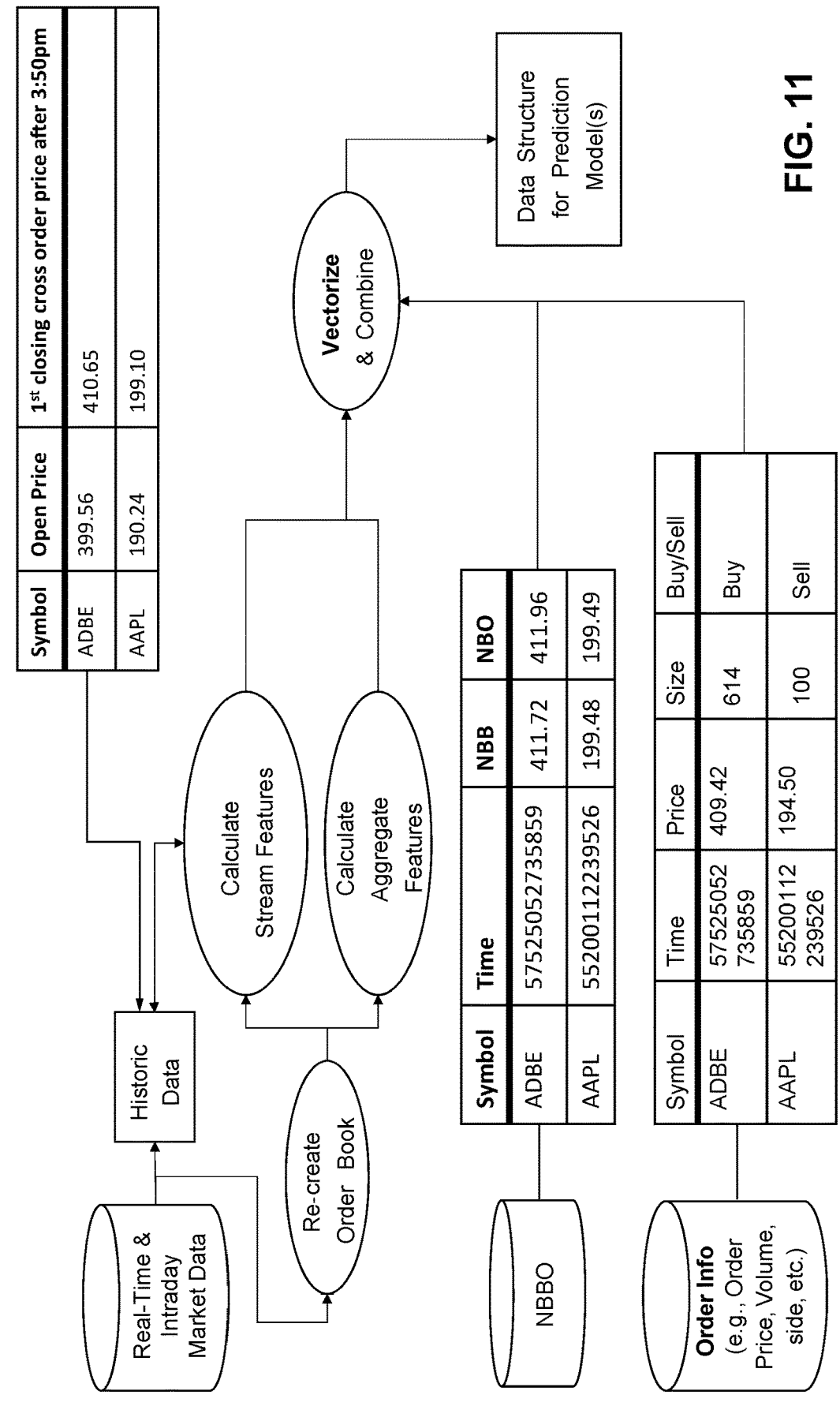
FIG. 11 is a diagram illustrating a specific example of pre-processing to generate input vectors for prediction according to an example an electronic trading platform embodiment.
Figure 12:
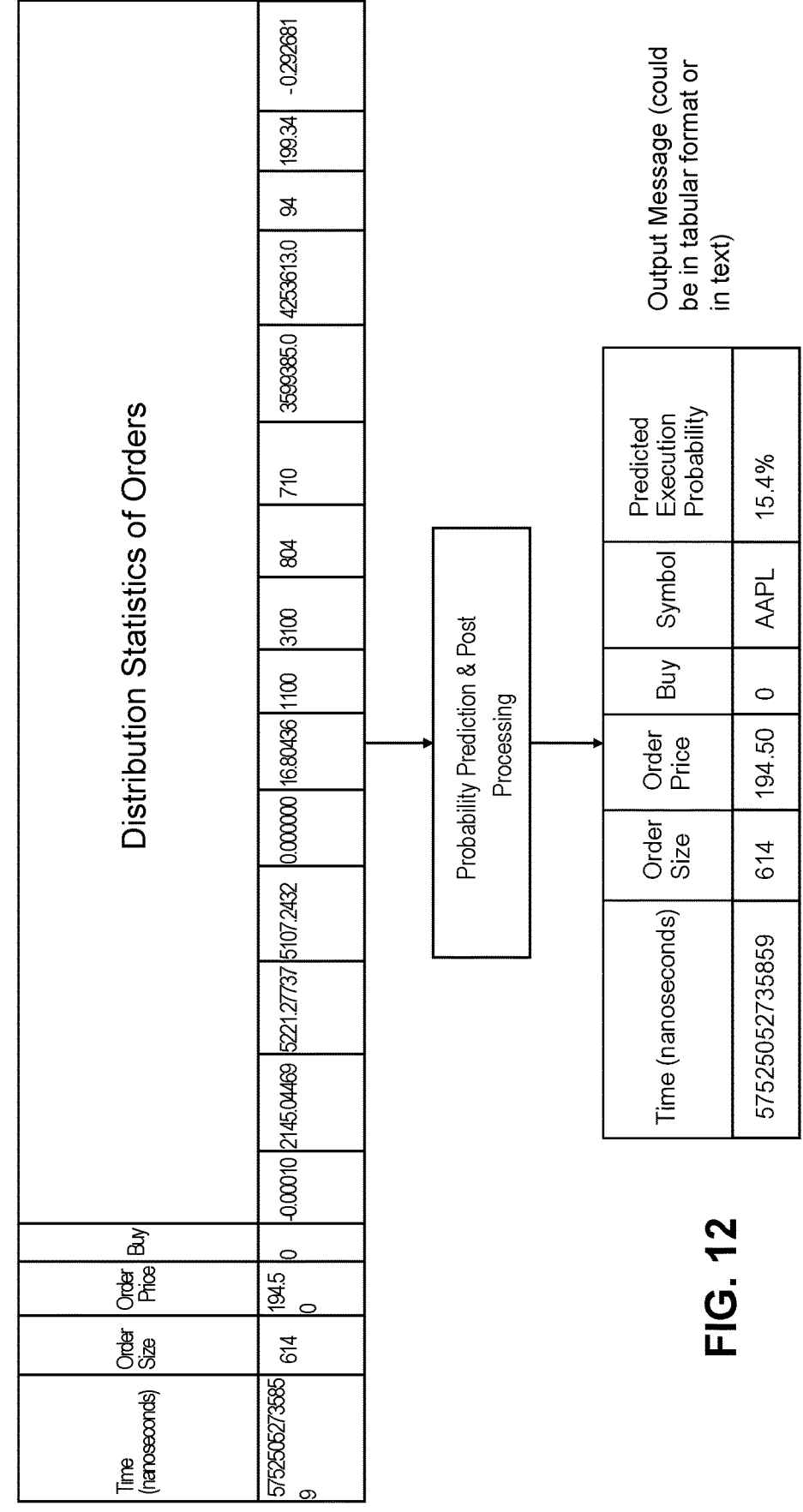
FIG. 12 is a diagram illustrating specific example of prediction, post-processing, and prediction output for a real-time single data point for each order according to example embodiments.

The relationship between the figures is now outlined in advance of their detailed description. FIG. 1 is an architecture diagram that shows components of the described computer system including machine learning models; FIG. 2 illustrates a method performed in FIG. 1's architecture for training predictive machine learning models; FIG. 3 illustrates a method performed in FIG. 1's architecture for using trained predictive machine learning models; FIG. 4 is an architecture diagram that shows a distributed computing system corresponding to an electronic trading platform as an example implementation of the computer system in FIG. 1; FIG. 5 is a system diagram showing data communications between various computer, data storage, and end user entities for an example closing cross auction application operating on the electronic trading platform in FIG. 4; FIG. 6 shows a real-time, asynchronous example prediction implementation based on the system in FIG. 5; FIG. 7 shows a batch processing example prediction implementation based on the system in FIG. 5; FIG. 8 illustrates an example of predictive machine learning model training useable in step S6 in FIG. 2; FIG. 9 shows a post processing example useable step S14 in FIG. 3; FIG. 10 shows a feed aggregation post processing example useable in step S14 in FIG. 3; FIG. 11 shows a specific example of pre-processing useable in step S2 in FIG. 2 and step S12 in FIG. 3 to generate input vectors for prediction; FIG. 12 shows a specific example of prediction, post-processing, and prediction output for a real-time single data point for each order for the real-time, asynchronous prediction example implementation in FIG. 6; FIG. 13 is a specific example of data for the batch processing prediction example implementation in FIG. 7; FIGS. 14A and 14B show specific examples of batch prediction outputs for the batch processing example implementation in FIG. 7; FIG. 15 shows an example computing system that may be used to implement the features shown in and described throughout this document, including those features shown in and described with reference to FIG. 1 through FIGS. 14A-14B.

Description of a Computer System—FIG. 1

FIG. 1 is a computer system diagram according to certain example embodiments. In many places in this document, including the description of FIG. 1, computer-implemented function blocks, functions, and actions may be implemented using software modules. It should be understood that function blocks, functions, and/or actions performed by software module(s) or processing node(s) are actually implemented by underlying hardware (such as at least one hardware processor and at least one memory device) according to program instructions specified by the software module(s). Details of an example computer system with at least one hardware processor and at least one memory device are provided in the description of FIG. 15. In addition, the described function blocks, functions, and actions may also be implemented using various configurations of hardware (such as FPGAs, ASICs, PLAs, discrete logic circuits, etc.) alone or in combination with programmed computer(s) (including for example blade servers).

Computer system 12 receives and processes data from one or more data sources 16 labeled as $S_1$, $S_2$, . . . , $S_N$. In FIG. 1, one or more databases 18 labeled as $DB_1$, $DB_2$, . . . , $DB_N$ can be additional data sources and/or may store input data from data sources 16. In certain examples, the data from the various data sources may be stored in a data warehouse or data lake (not shown) that may then be queried and operated on by computer system 12.

Ultimately, computer system 12 is configured to receive and process information from an arbitrary number of data sources. In certain instances, the data sources may include one or more internal data sources (e.g., that are operated by the same organization operating computer system 12) and/or one of more external data sources (e.g., operated by one or more different organizations). Data sources may include data wire service providers (e.g., a data "wire" service similar in the way Reuters is a news service). In certain instances, the data sources may be subscribed to by system 12. The data sources and the data formats for those data sources may be heterogeneous or homogeneous in nature, and as such, any type of data format may be acceptable.

Input data stored in the databases 18 may include different types of data and may be in any form including in tabular form with columns or in some other organized form of elements or nodes. Example input data from the databases 18 in the context of machine learning (ML) models (e.g., neural networks) for data analysis include direct features and indirect features. One or more transceivers and/or interfaces 20 receive the input data from the database(s) 18 along with multiple data transaction objects received from multiple source nodes one or more data source nodes 16 $S_1$, $S_2$, . . . , $S_N$ and send output generated by the computer system 12 for one or more users and/or for one or more other computer systems. One or more hardware processors 21 are shown as examples. It is understood that all of the functions of the computer system may be performed using a processing system having one or more hardware processors 22 in a centralized fashion and/or using one or more dedicated hardware processors dedicated to perform certain functions of the computer system 12.

Using programs and data stored in the pre-processing module 23 of the one or more memories 22, the processor(s) 21 perform pre-processing of the input data. Example pre-processing includes parsing and formatting the input data and the multiple data transaction objects into an input data structure having a standard format for further processing using the predictive machine learning model(s) 25 in the prediction module 24. In certain example embodiments, the input data structure includes a combination of two or more of the different types of input data. Any suitable standard format may be used. Example standard formats can be a vectorized format, a tabular format, tensor format, hierarchical format (e.g., JSON), etc.

The memor(ies) 22 store a prediction module 24 with one or more predictive machine learning (ML) models 25, which when executed by the processor(s) 21, analyze the preprocessed data and predict a probability of execution of each of the data transaction objects at a future execution time. In example embodiments, each of the data transaction objects includes one or more conditions, and the probability of execution includes a probability satisfying the one or more conditions associated with the one of the data transaction objects.

The ML model training module 26 initially trains, and if desired later, retrains, the one or more predictive machine learning models 25. The training may be done over multiple iterations. In example embodiments, the training by the ML model training module 26 can start with a base predictive model. A further predictive model is determined based on errors of the base predictive model predicting execution of the data transaction objects at the future execution time as compared to actual execution of the data transaction objects at the future execution time. Then, the further predictive model is combined with the base predictive model to generate a "current" base predictive model. A new further predictive model is determined based on errors of the current base predictive model predicting execution of the data transaction objects at the future execution time as compared to actual execution of the data transaction objects at the future execution time. This process is repeated until the errors are below a predetermined error threshold, the errors reach a predetermined number of repetitions, the decrease in the errors for a current repetition as compared to the errors for one or more prior repetitions is less than a threshold, etc.

In example embodiments, one or more of the predictive machine learning models 25 may include a gradient boost prediction model, a decision tree, or a logistic regression.

The post-processing module 27 receives probabilities for each of the data transaction objects and generates an output data message indicating a probability of execution for one or more of the data transaction objects at the future execution time. The output data messages may include fields that indicate multiple parameters and/or conditions for each of the data transaction objects.

In some example embodiments, the post-processing module 27 generates and outputs data messages as a real time response to receiving one data transaction object from a source node. In other example embodiments, the post-processing module 27 generates and outputs data messages in batches, with a batch indicating a corresponding probability of execution for each of the multiple data transaction objects in the batch at the future execution time. The batches may be generated periodically and in any suitable format, such as in in tabular format, text format, etc.

The message disseminator module 28 disseminates the output data messages including real time and batch messages to the source nodes 16, e.g., client devices, one or more of the databases 18 for storage, one or more data links in a cloud computing service (like one or more of e.g. Amazon Web Services (AWS) or Azure), one or more private data feeds (like those offered by Nasdaq) and/or one or more public data feeds. The message disseminator module 28, like all of the modules in FIG. 1, may be implemented using computer hardware executing and software code, using FPGAs, blade processors or servers, ASICs, or any combination of these.

In example embodiments, the computer system 12 may be implemented in a cloud-based computer environment and may be implemented across one or more physical computer nodes (such as, for example, a computer node as shown in FIG. 15). In certain examples, different modules of the computer system 12 may be implemented on virtual machines implemented on corresponding physical computer hardware.

Description of Computer-Implemented Model Training Procedures—FIG. 2

FIG. 2 is a flowchart showing example computer-implemented procedures for training one or more predictive machine learning models implemented by the computer system 12 according to certain example embodiments.

In step S1, the transceiver(s)/interface(s) 20 receive over the data communications network 14 multiple data transaction objects from multiple source nodes and different types of input data possibly relevant to one or more of the data transaction objects. In step S2, the computer system 12 processes the different types of input data and the data transaction objects to generate an input data structure for each of the data transaction objects. Based on the input data structure, the computer system 12, in step S3, predicts using one or more predictive machine learning models, a probability of execution for each of the data transaction objects at a future execution time. In step S4, the computer system 12 determines an error of a current predictive model's execution compared to actual execution at the future execution time for each of the data transaction objects. Then, in step S5, a decision is made whether to stop the training. Various example techniques may be used to determine whether to stop such as when the error is less than a threshold. If not, the procedure returns to repeat steps S2-S5 after adjusting the one or more predictive machine learning models to reduce the error in step S6. If so, the procedure continues to step S7 to deploy the trained predictive model for use by the computing system 12 to make predictions. Here, deploying may include, in various embodiments, activities such as loading and/or installing the trained predictive model to be used in generating predictions in (a) the prediction module 24 in FIG. 1, (b) in the Intelligent Closing Cross Application 33B in FIGS. 4-7 described below, or (c) in to some other computing environment in which the predictive model may be used.

FIG. 3 is a flowchart showing example computer-implemented procedures for using one or more predictive machine learning models according to certain example embodiments. In step S10, the transceiver(s)/interface(s) 20 receive over the data communications network 14 multiple data transaction objects from multiple source nodes and different types of input data possibly relevant to one or more of the data transaction objects. In step S12, the computer system 12 processes the different types of input data and the data transaction objects to generate an input data structure for each of the data transaction objects. Based on the input data structure, the computer system 12, in step S13, predicts using one or more predictive machine learning models, e.g., after being trained and deployed, a probability of execution for each of the data transaction objects at a future execution time. In step S14, the computer system performs post-processing, e.g., addition/subtraction, categorization, and/or formatting, etc. on the predictions. In step 515, the computing system 12 generates output data messages for transmission by the message dissemination module 28 via one or more transceivers over the data communications network to source nodes 16, databases 18, data links, data feeds, etc. indicating a probability of execution for at least one of the data transaction objects at the future execution time period. Examples of different types of output messages are illustrated in FIGS. 12, 13, 14A, and 14B described below. The procedure may return to step S10 to repeat the procedure for changed and/or new input data and/or new data transaction objects.

Description of an Example Architecture of the Computer System—FIG. 4

As mentioned earlier, many specific applications can benefit from predictions provided by the computer system 12. Other example applications include weather prediction, genetic disease diagnosis, and any other machine learning application. One detailed example directed to an electronic trading platform is now described in conjunction with FIG. 4. FIG. 4 shows a system architecture for a distributed computing system 30 corresponding to an electronic trading platform that can be used in certain example embodiments to implement the procedures described above for FIGS. 2 and 3. The distributed computing system 30 communicates data messages with various client systems 31 over a data communications network like the source nodes 16 and network 14 shown in FIG. 1. Each client system 31 includes one or more computers associated with one or more users of the distributed computing system 30.

The distributed computing system 30 includes input order ports 36 for receiving electronic order messages for financial instruments, e.g., equities, fixed-income products, derivatives, and currencies, from client systems 31 and stores information related to the received electronic order messages in one or more order databases. The orders maybe received in a particular format such as the OUCH format. Market data is received from one or more data feeds at an incoming data feed port 37 and stored in one or more data feed databases. The market data for a particular financial instrument may include the identifier of the instrument and where it was traded such as a ticker symbol and exchange code plus the latest bid and ask price and the time of the last trade. It may also include other information such as volume traded, bid, and offer sizes and static data about the financial instrument that may have come from a variety of sources.

A matching engine 32 includes memory 35 storing computer programs which when executed by one or more data processors implement one or more trading algorithms to match received orders which are typically stored in a corresponding order book 34. The distributed computing system 30 also includes multiple software applications 33A-33N. Each application is associated with memory that stores one or more computer programs, which when executed by one or more data processors, implements the application. For example, software application 33A is an opening auction application for implementing an opening auction on the trading exchange platform to determine opening prices of financial instruments. An intelligent closing cross software application 33B, when executed, conducts a daily closing auction at the end of a trading day to determine an instrument's closing price before the market closes and reopens the following day. The closing prices are important because mutual funds for example "mark to market" based on the closing prices. Another auction application may be an intraday auction. The software applications 33A-33N are coupled to listen to a sequenced data bus (not shown) in the distributed computing system 30 to communicate with the matching engine 32, the order port(s) 36, the incoming data feed 37, and an outgoing data feed 38 via the sequenced data bus.

Order, trade, and trade prediction information is provided to the outgoing data feed 38 and output on the data feed in a particular format, e.g., in ITCH format. The output feed data may include a variety of data features such as the identifier of the instrument, where it is to be or was traded, the latest bid and ask price, bid and ask volumes, price and volume of actual trades, The output feed data also includes predicted execution probabilities for trade orders at a future point in time, and various statistical information, examples of which are described later.

The examples below relate to the intelligent closing cross software application 33B which includes pre-processing, prediction, model training, post-processing, and message disseminator modules like 23-28 shown in FIG. 1. In these examples, the incoming data transaction objects are incoming trade orders and the predictions relate to probabilities of execution of the trade orders at closing cross time.

Description of an Example Application of the Computer System—FIG. 5

FIG. 5 shows an implementation of the intelligent closing cross software application 33B in the electronic trading platform 30 in FIG. 4 according to certain example embodiments. Electronic trading platforms must process enormous volume of data messages with extremely low latency. In example embodiments applied to electronic trading platforms, the data transaction objects are electronic trade order messages transmitted over a data communications network to a computer system that implements the electronic trading platform.

The input data in this example is a variety of market data. A basic infrastructure of public market data providers is known as the Securities Information Processors (SIPs). "Core data" is provided over data networks to user terminals through SIP data and includes: (1) price, size, and exchange of the last executed trade transaction; (2) each trading platform's current highest bid price and lowest offer price, and the number of shares available at those prices; and (3) the national best bid and offer (NBBO). Depth of order book information allows users to see what quotes and orders are available on a trading platform that are more expensive than the current best offer to sell or cheaper than the best bid to buy a security.

Also related to market data are auctions, which play an important role in determining prices for traded securities. The intelligent closing cross application 33B matches bids and offers in a given security to create a final price of the day. User terminals at client systems 31 can place different types of orders such as "market on close," which means buy or sell at the official closing price, "limit on close," and imbalance only orders on close. With a limit on close order, if the price at the close is better than the specified limit, then the trade transaction will be executed at the market price. One known trading platform collects data for the closing cross between 3:50 p.m. and the closing time of 4:00 p.m. Cross orders are executed between 4:00 p.m. and five seconds after 4:00 p.m. A similar opening cross auction occurs in the morning implemented by an opening auction application 33A in FIG. 4. Although a very large proportion of trades executing occurs during auctions, little auction information is currently included in current SIP data.

The intelligent closing cross application 33B operates using computer-implemented procedures like those shown in FIGS. 2 and 3 but applied to an electronic trading platform according to certain example embodiments. The input data in FIG. 5 may provided from incoming data feed databases including "core data" from a database 48 having real-time market data and from a SIP database 50 that includes NBBO data. The order information received from user terminals is initially stored in an order information database 52 and includes order type, price, volume, etc. The input data and the order information are received by one or more pre-processor(s) 42 that pre-process the input data and the order information using feature engineering, i.e., a process of using domain knowledge (market knowledge in this trading platform application) to extract features (characteristics, properties, attributes) from the input data and the order information. The extracted features are used to generate input data structures, e.g., input data vectors via a vectorization process, used by one or more prediction processors 44 to predict order execution probabilities based on one or more machine learning (ML) model(s) described herein to predict the execution probability of opening and/or closing cross orders to (i) increase opening and/or closing cross trading volume, and (ii) provide users with further useful data to improve opening and/or closing cross trading. Post processor(s) 46 then perform post-processing on the predicted order execution probabilities to generate output prediction data that includes predicted order execution probabilities.

As described below, when the output prediction data is disseminated by a message disseminator (shown as part of module 46 in FIG. 5) in real-time per data object, the term post-processing is used. When the output prediction data is disseminated by the message disseminator 46 for a batch of data objects, a feed aggregator performs post-processing also as indicated at 46 in FIG. 5. In both situations, the output prediction data is provided via message disseminator to end users 54 such as trader terminals other data subscriber terminals, shown as client systems 31 in FIG. 4, and to output data feeds 38. Detailed examples of the input data structure, the predicting order execution probabilities using one or more machine learning models, and the post-processing are provided in other places herein.

As mentioned above, pre-processor(s) 42 use feature engineering to pre-process the input market data from 48-52 and the trade orders and create an input data structure like an input vector using a vectorization process. For example, trade order information may be received and stored in the order information database 50 in a JavaScript Object Notation (JSON) format such as {symbol: XYZ, time: aaaa, price: $xyz.ab, etc.} The pre-processor 42 parses that trader order data in JSON format and converts into a tabular or vector format. Example market and order features may include: instrument symbol, order type (e.g., market on close (MOC), limit on close (LOC), etc.), order time, order volume, order price, order side, etc. The input data structure may include a combination of two or more of the different types of input market data such as volume and weighted price as an example.

Description of a Real-Time/Asynchronous Implementation—FIG. 6

FIG. 6 is a system diagram showing a real-time/asynchronous implementation of the intelligent closing cross application 33B shown in FIG. 5 according to certain example embodiments.

An individual data point 60 corresponds to an individual trade order received from the order information databases 50 or directly from a client system 31 in real time. The data point 60 may be received for example in JSON format as mentioned above. Feature engineering and vectorization pre-processing at 42 converts the data point 60 and market input data (not shown in FIG. 6) as described above for FIG. 5 into a standard data input structure like an input vector. The data input structure is processed in the prediction processor 44 using one or more machine learning models to generate a probability of this particular trade order corresponding to data point 60 being executed at a predetermined future time. After post-processing by the post-processor(s) 46 of the predicted probabilities, a message disseminator 62 sends a "get request," and the prediction post-processor(s) 46 returns a prediction probability message including information including a probability of this particular trade order being executed at the future time. The message disseminator 62 then provides this probability information to an outgoing data feed database 38, e.g., formatted as an ITCH data protocol message as shown in FIG. 4 and provided as "core information."

The real-time prediction embodiment is advantageous because prediction information is delivered in real-time rather than waiting to provide the prediction information at a later designated time.

Description of a Batch Implementation—FIG. 7

FIG. 7 is a system diagram showing a batch implementation of the intelligent closing cross application 33B shown in FIG. 5 according to certain example embodiments.

Multiple data points 64 corresponding to multiple trade orders are received from the order information database 50 or directly from a client system 31 at the same time and/or at different real times, e.g., in JSON format. Pre-processor 42 performs feature engineering and vectorization pre-processing to transform the data points 64 and market input data (not shown) into standard data input structures like input vectors. The data input structure is processed in the prediction processor 44 using one or more prediction models to generate a probability of each trade order corresponding to data points 64 being executed at a predetermined future time. The predicted probabilities are then post-processed by post-processor 46. An interval listener and message disseminator 66 generates a "get request" at predetermined times, e.g., at periodic time intervals, and sends it to the post processor 46. In response to a "get request," the post-processor 46 returns a prediction probability message including information including a probability of this particular trade order being executed at the future time. The interval listener and message disseminator 66 then provides this probability information to an outbound message database 58, e.g., formatted as an ITCH data protocol message, to be provided on the outgoing data feed 38 shown in FIG. 4, e.g., as part of "core information."

The batch embodiment provides an efficient way to collect new messages and deliver messages at specified times instead of having to respond immediately.

Description of Predictive Machine Learning Model Training—FIG. 8

Although any suitable machine learning model may be used by prediction processor 44 in FIGS. 5-7, FIG. 8 is a diagram illustrates an example predictive machine learning model training according to example embodiments. In particular, FIG. 8 illustrates conceptually model training using a gradient boost approach where each current model's errors is determined and added to the existing model. For example, base model M1 is combined with a second model M2 after a first training iteration. A third model M3 is added after a subsequent training iteration, and fourth model M4 is added after a further training iteration. This model training is done repeatedly until the model's performance is sufficient. The following pseudocode illustrates an example:

$h(x) = model_0(x)$ error(x)=true values–h(x)

i=1 while error(x) is not yet sufficiently low:

$model_i(x)$=model on the current error(x)

h(x)=h(x)+$model_i(x)$ #Add the models error(x)=true values–h(x) #Update the errors increment i Return h(x) #Final model This process may be repeated until the errors are below a predetermined error threshold, the errors reach a predetermined number of repetitions, or a decrease in the errors for a current repetition as compared to the errors for one or more prior repetitions is less than a threshold, or some other criterion(a) is(are) met.

Description of Post-Processing—FIG. 9

FIG. 9 is a diagram illustrating an example implementation of post processing performed by post-processor 46 according to example embodiments that may be implemented in any or all of the embodiments in FIGS. 1 and 4-7. The prediction processor 44 generates one or more predictions 70 and then provides the one or more predictions 70 to the post-processor 46 for post-processing. FIG. 9 shows example post-processing 72 based on one or more predetermined arithmetic rules like addition, subtraction, categorization, etc. An example of categorization might be to assume values between 0 and 1 and categorize the predictions as follows: 0-0.2=Very Unlikely; 0.20.4=Unlikely; 0.40.6=Inconclusive; 0.60.8=Likely; and 0.8-1=Very Likely. The post-processor 46 then generates a post-process prediction 74 for output.

Description of Feed Aggregation—FIG. 10

FIG. 10 is a diagram illustrating an example implementation of feed aggregation according to batch example embodiments such as the batch embodiment in FIG. 7. Here, the post-processor 46 may sort predictions 74 as indicated at 76, e.g., based on one or more of price, size, symbol, time, order size, etc. The sorted predictions 76 may then be formatted in tabular or other suitable format for output, e.g., over one or more market feeds 78.

Description of Pre-Processing—FIG. 11

FIG. 11 is a diagram illustrating a specific example of pre-processing to generate input vectors for prediction according to example embodiments such as those in FIGS. 4-7. Real-time and intraday market data are parsed into historic data and to re-create one or more order books for one or more instruments traded on the platform. An example of historic data is shown for two stocks, Adobe (ADBE) and Apple (AAPL), which includes a respective opening price and a respective first closing cross order price after 3:50 PM for each stock. The pre-processor 42 receives real-time market data, re-creates an order book for a specific point in time, and calculates streamed or real-time features from the real-time market data and aggregated features from the historic data and the re-created order book.

The pre-processor 42 then combines the intraday and real time market stream features and the aggregate features with (i) example NBBO data for Adobe and Apple at respective future trading times and (ii) example order information including a buy order for Adobe and a sell order for Apple and the same times as the NBBO times for Adobe and Apple. The pre-processor 42 vectorizes the combined result to generate a corresponding input data structure from the combined data, e.g., by transforming the combined data into a vector format, and provides the input data structure to the prediction processor 44 for prediction model training and for prediction processing using one or more trained prediction models.

Description of a Specific Example of Prediction, Post-Processing, and Prediction Output for a Real-Time Single Data Point—FIG. 12

FIG. 12 illustrates a specific example for a real-time single data point (data object) for each order according to example embodiments such as the example embodiment shown in FIG. 6. An input data structure is shown for a single data point for an order to buy shares for Apple at $194.50 at a time of arrival calculated from midnight: 57525052735859. After probability prediction and post-processing, an output message is generated by the post-processor 46 showing at a future trading time 57525052735859 for a buy order for Apple at $194.50 for 614 shares has a predicted execution probability of 15.4%.

Post-processing may also include or replace "Predicted Execution Probability" with "Likelihood of Execution," where the Likelihood of Execution may have a value from the following for example: "Very likely," "Likely," "Somewhat likely," "Unlikely," etc.

Description of a Specific Example of Prediction for a Batch of Orders—FIG. 13

FIG. 13 is a diagram illustrating specific example of prediction for a batch of orders according to example embodiments such as the example embodiment shown in FIG. 7. This example shows five trade orders at five different future trading times for corresponding different numbers of shares of Apple at a corresponding price and order type (where a 0 means an ask or sell order and a 1 means a bid or buy order). Examples of input market data for the Apple stock include various distribution statistics. Other input market data may be used.

Description of Some Example Batch Prediction Outputs FIGS.—14A and 14B

FIGS. 14A and 14B are charts illustrating two specific examples for batch prediction outputs according to example embodiments such as the example embodiment shown in FIG. 7.

FIG. 14A shows an example batch prediction output message for Apple (AAPL) at two different dissemination times 3:50:49 PM and 3:56:50 PM at five different prices for five different order sizes 10, 50, 100, 500, and 1000. Each price row and order size has a corresponding ask probability or bid probability of occurring at the corresponding transaction time. For example, an AAPL order to sell at $100.02 for 50 shares has a probability of matching (executing) of 85%. This is a higher probability than for an AAPL order to sell at $99.98 for 1000 shares, which has a probability of matching (executing) of 40%. This disparity of probability is valuable for not only the traders interested in trying to trade at one of these prices and amounts that this time but also for other traders interested in trading Apple.

FIG. 14B shows another example batch output probabilities message for Apple stock for the same two future trading times. Here, execution probabilities are shown for two different order types: LOC (limit on close) and IO (imbalance only). Higher minimum buy prices for all order sizes for both LOC and IO order types typically return higher probabilities of execution than for lower minimum buy prices. See for example that for an IO order for 100 shares a buy price of $129.49 has an execution probability at probability calculation time or probability dissemination time 3:56:49 PM of 99.97% while a slightly lower price of $129.47 has a considerably lower execution probability at probability calculation time or probability dissemination time 3:56:49 PM of 75%. On the sell side, slightly lower maximum sell prices for all order sizes for both LOC and IO order types return considerably higher probabilities of execution than for higher maximum sell prices. See for example that for an LOC order for 100 shares a sell price of $129.38 has an execution probability at future time 3:56:49 PM of 99.97% while a slightly higher price of $129.47 has a considerably lower execution probability at future time 3:56:49 PM of 75%.

Description of FIG. 15

FIG. 15 shows a computing device 500 (which may also be referred to, for example, as a "computer system" or a "computing system") that includes one or more of the following: one or more processors 502; one or more memory devices 504; one or more network interface devices 506; one or more display interfaces 508; and one or more user input adapters 510. Additionally, in some embodiments, the computing device 500 is connected to or includes a display device 512. As will explained below, these elements (e.g., the processors 502, memory devices 504, network interface devices 506, display interfaces 508, user input adapters 510, display device 512) are hardware devices (for example, electronic circuits or combinations of circuits) that are configured to perform various different functions for the computing device 500.

In some embodiments, each or any of the processors 502 is or includes, for example, a single-core or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 502 uses an instruction set architecture such as x86 or Advanced RISC Machine (ARM).

In some embodiments, each or any of the memory devices 504 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 502). Memory devices 504 are examples of non-volatile computer-readable storage media.

In some embodiments, each or any of the network interface devices 506 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 508 is or includes one or more circuits that receive data from the processors 502, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 512, which displays the image data. Alternatively or additionally, in some embodiments, each or any of the display interfaces 508 is or includes, for example, a video card, video adapter, or graphics processing unit (GPU).

In some embodiments, each or any of the user input adapters 510 is or includes one or more circuits that receive and process user input data from one or more user input devices (not shown) that are included in, attached to, or otherwise in communication with the computing device 500, and that output data based on the received input data to the processors 502. Alternatively or additionally, in some embodiments each or any of the user input adapters 510 is or includes, for example, a PS/2 interface, a USB interface, a touchscreen controller, or the like; and/or the user input adapters 510 facilitates input from user input devices (not shown) such as, for example, a keyboard, mouse, trackpad, touchscreen, etc.

In some embodiments, the display device 512 may be a Liquid Crystal Display (LCD) display, Light Emitting Diode (LED) display, or other type of display device. In embodiments where the display device 512 is a component of the computing device 500 (e.g., the computing device and the display device are included in a unified housing), the display device 512 may be a touchscreen display or non-touchscreen display. In embodiments where the display device 512 is connected to the computing device 500 (e.g., is external to the computing device 500 and communicates with the computing device 500 via a wire and/or via wireless communication technology), the display device 512 is, for example, an external monitor, projector, television, display screen, etc. . . .

In various embodiments, the computing device 500 includes one, or two, or three, four, or more of each or any of the above-mentioned elements (e.g., the processors 502, memory devices 504, network interface devices 506, display interfaces 508, and user input adapters 510). Alternatively or additionally, in some embodiments, the computing device 500 includes one or more of: a processing system that includes the processors 502; a memory or storage system that includes the memory devices 504; and a network interface system that includes the network interface devices 506.

The computing device 500 may be arranged, in various embodiments, in many different ways. In various embodiments, the computing device 500 includes one, or two, or three, four, or more of each or any of the above-mentioned elements (e.g., the processors 502, memory devices 504, network interface devices 506, display interfaces 508, and user input adapters 510). Alternatively, or additionally, in some embodiments, the computing device 500 includes one or more of: a processing system that includes the processors 502; a memory or storage system that includes the memory devices 504; and a network interface system that includes the network interface devices 506. Alternatively, or additionally, in some embodiments, the computing device 500 includes a system-on-a-chip (SoC) or multiple SoCs, and each or any of the above-mentioned elements (or various combinations or subsets thereof) is included in the single SoC or distributed across the multiple SoCs in various combinations. For example, the single SoC (or the multiple SoCs) may include the processors 502 and the network interface devices 506; or the single SoC (or the multiple SoCs) may include the processors 502, the network interface devices 506, and the memory devices 504; and so on. Further, the computing device 500 may be arranged in some embodiments such that: the processors 502 include a multi- (or single)-core processor; the network interface devices 506 include a first short-range network interface device (which implements, for example, WiFi, Bluetooth, NFC, etc.) and a second long-range network interface device that implements one or more cellular communication technologies (e.g., 3G, 4G LTE, CDMA, etc.); and the memory devices 504 include a RAM and a flash memory. As another example, the computing device 500 may be arranged in some embodiments such that: the processors 502 include two, three, four, five, or more multi-core processors; the network interface devices 506 include a first network interface device that implements Ethernet and a second network interface device that implements WiFi and/or Bluetooth; and the memory devices 504 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the computer system 12, the memory devices 504 could load program instructions for the functionality of the data pre-processor(s) 21, 42, the prediction module 24, 44, the predictive ML models 25, the ML model training module(s) 26, 44, and the post-processing module 27, post processor/ feed aggregator 46, each of which will be referred to individually for clarity as a "component" for the remainder of this paragraph, are implemented using an example of the computing device 500 of FIG. 15. In such embodiments, the following applies for each component: (a) the elements of the 500 computing device 500 shown in FIG. 15 (i.e., the one or more processors 502, one or more memory devices 504, one or more network interface devices 506, one or more display interfaces 508, and one or more user input adapters 510), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 504 (e.g., in various embodiments, in a volatile memory device such as a RAM or an instruction register and/or in a non-volatile memory device such as a flash memory or hard disk) and all actions described herein as performed by the software modules are performed by the processors 502 in conjunction with, as appropriate, the other elements in and/or connected to the computing device 500 (i.e., the network interface devices 506, display interfaces 508, user input adapters 510, and/or display device 512); (c) alternatively or additionally, to the extent it is described herein that the component processes and/or otherwise handles data, in some embodiments, such data is stored in the memory devices 504 (e.g., in some embodiments, in a volatile memory device such as a RAM and/or in a non-volatile memory device such as a flash memory or hard disk) and/or is processed/handled by the processors 502 in conjunction, as appropriate, the other elements in and/or connected to the computing device 500 (i.e., the network interface devices 506, display interfaces 508, user input adapters 510, and/or display device 512); (d) alternatively or additionally, in some embodiments, the memory devices 502 store instructions that, when executed by the processors 502, cause the processors 502 to perform, in conjunction with, as appropriate, the other elements in and/or connected to the computing device 500 (i.e., the memory devices 504, network interface devices 506, display interfaces 508, user input adapters 510, and/or display device 512), each or any combination of actions described herein as performed by the component and/or by any software modules described herein as included within the component.

The hardware configurations shown in FIG. 15 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 15, (e) via other hardware arrangements, architectures, and configurations, and/or via combinations of the technology described in (a) through (e).

Technical Advantages of Described Subject Matter

The technological improvements offered by the technology described in this application can be applied for example in electronic trading platforms, weather prediction, genetic disease diagnosis, and other machine learning applications, message routing optimization in data networks, some supply chain delivery problems, and any domain that requires resource allocation.

As explained in the detailed examples described above, the technology may be applied in one or more domains to analyze very large amounts of data for each of many possible, diverse data categories and objects (e.g., including thousands, millions, or even more different possible data sets for each category's data objects) and narrow those large amounts to identify a subset of those data objects that are worth the processing resources required to generate useful data, e.g., that have a high probability of being of executed and/or of being of significant interest to end users. That narrowing is achieved by predicting, using one or more predictive machine learning models, a probability of execution of each of the data transaction objects at a future execution time, where the probability of execution for the at least one of the data transaction objects includes a probability satisfying the one or more conditions associated with the one of the data transaction objects. Further, the output data messages allow the volume of information to be transmitted over the data communications network to be substantially reduced because communications can be focused on the data transaction objects indicated to have a higher probability of execution in the future. Less data to be communicated, stored, and processed means less data needs to be communicated over data communication networks by the computer system to end users. It also means there is lower consumption of other computer system resources like memory, storage capacity, and data processing capacity. That results in another benefit—improved performance of the computer system including faster processing speed, faster data communication speed, lower power consumption, and the like.

Using the predictive machine learning model(s) provides another technical advantage of intelligently narrowing large amounts of data to process that is efficient and accurate.

The predictive machine learning model retraining provides another technical advantage. The retraining can be accomplished by adding a base predictive model with a further predictive model to generate a current base predictive model. The further predictive model is based on errors of the current base predictive model predicting execution of the data transaction objects at the future execution time as compared to actual execution of the data transaction objects at the future execution time. The retraining process preferably repeats, e.g., until the errors are below a predetermined error threshold, the number of iterations reach a predetermined number, or a decrease in the errors for a current repetition as compared to the errors for one or more prior repetitions is less than a threshold. Using the current base predictive model and this retraining process allows the computer system 12 to adapt to a rapidly changing environment where input data, data objects, variable and parameter values change, and as a result, the predictions are more accurate and reliable.

Another technical advantage is the computer system 12 is highly compatible with standard product development frameworks (such as Agile).

Another technical advantage is that the computer system 12 is readily maintained because it is highly modularized, e.g., the prediction module 24, the ML model training module 30, the pre-processing module 23, and the post-processing module 27. As a result, there is no need to understand the entire computer system 12 or an application of the computer system 12 to maintain and/or enhance part(s) of the system.

Other advantages include efficient management of double auctions by creating and operating a self-optimizing computing environment.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIGS. 1-14, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A distributed computer system to optimize, using predictive machine learning, allocation of computer and data communication resources for data transaction objects that are likely to be executed at a future execution time, comprising:

a transceiver configured to receive over a data communications network different types of input data and data transaction objects from multiple source nodes communicating with the data communications network;

a processing system that includes at least one hardware processor, the processing system configured to:

process the different types of input data and the data transaction objects to generate an input data structure for each of the data transaction objects;

based on the input data structure, predict, using one or more predictive machine learning models, a probability of execution of each of the data transaction objects at a future execution time;

allocating computer and data communication resources for data transaction objects that have a predicted probability of execution at the future execution time that equals or exceeds a predetermined probability threshold and avoiding allocating computer and data communication resources for data transaction objects that have a predicted probability of execution at the future execution time that is less than the predetermined probability threshold;

generate output data messages for transmission by the transceiver over the data communications network indicating the probability of execution for at least one of the data transaction objects at the future execution time;

monitoring and identifying changes that affect the data transaction objects; and adapting the allocation of computer and data communication resources for data transaction objects based on the changes to reduce an amount of data communicated over data communication networks, lower consumption of other computer system resources, and improve performance of the computer system.

2. The computer system in claim 1, wherein each of the data transaction objects includes one or more conditions, and wherein the probability of execution for the at least one of the data transaction objects includes a probability of meetingsatisfying the one or more conditions associated with the one of the data transaction objects.

3. The computer system in claim 1, wherein the input data structure includes a combination of two or more of the different types of input data.

4. The computer system in claim 1, wherein the different types of input data have different data formats, and wherein the input data structure includes a vector format, a tabular format, and/or a hierarchical format.

5. The computer system in claim 1, wherein the generating includes generating an output data message indicating a probability of execution for one of the data transaction objects at the future execution time as a real time response to receiving the one data transaction object from a source node.

6. The computer system in claim 1, wherein the output data messages are generated in batches with each batch indicating a probability of execution for multiple ones of the data transaction objects at the future execution time, and wherein the batches are generated periodically.

7. The computer system in claim 1, wherein the output data messages are in tabular format, text format, and/or a hierarchical format.

8. The computer system in claim 1, wherein the output data messages include fields that indicate multiple parameters and multiple conditions for each of the data transaction objects.

9. The computer system in claim 1, wherein the one or more predictive machine learning models includes a gradient boost prediction model.

10. The computer system in claim 1, wherein the processing system is configured to training the one or more predictive machine learning models by the following steps:

(i) adding a base predictive model with a further predictive model to generate a current base predictive model, wherein the further predictive model is based on errors of the current base predictive model predicting execution of the data transaction objects at the future execution time as compared to actual execution of the data transaction objects at the future execution time, and (ii) repeating step (i).

11. The computer system in claim 10, wherein the processing system is configured to repeat step (i) until the errors are below a predetermined error threshold, the number of iterations reach a predetermined number, or a decrease in the errors for a current repetition as compared to the errors for one or more prior repetitions is less than a threshold.

12. The computer system in claim 10, wherein each of the predictive machine learning models includes a decision tree or a logistic regression.

13. A method, comprising:

receiving by a transceiver over a data communications network different types of input data and data transaction objects received from multiple source nodes communicating with the data communications network;

executing, by a processing system that includes at least one hardware processor, instructions stored in memory and, in accordance with the instructions, performing operations that include:

(a) processing the different types of input data and the data transaction objects to generate an input data structure for each of the data transaction objects;

(b) based on the input data structure, predicting, using one or more predictive machine learning models, a probability of execution of each of the data transaction objects at a future execution time;

(c) using the predicted probability of execution of each of the data transaction objects to optimize allocation of computer and data communication resources including allocating computer and data communication resources for data transaction objects that have a predicted probability of execution at the future execution time that equals or exceeds a predetermined probability threshold and avoiding allocating computer and data communication resources for data transaction objects that have a predicted probability of execution at the future execution time that is less than the predetermined probability threshold;

(d) generating output data messages for transmission by the transceiver over the data communications network indicating the probability of execution for at least one of the data transaction objects at the future execution time;

(e) monitoring and identifying changes that affect the data transaction objects; and (f) adapting the allocation of computer and data communication resources for data transaction objects based on the changes to reduce an amount of data communicated over data communication networks, lower consumption of other computer system resources, and improve performance of the computer system.

14. The method in claim 13, wherein each of the data transaction objects includes one or more conditions, and wherein the probability of execution for at least one of the data transaction objects includes a probability of meeting the one or more conditions associated with the one of the data transaction objects.

15. The method in claim 13, wherein the different types of input data have different data formats, and wherein the input data structure includes a vector format, a tabular format, and/or a hierarchical format.

16. The method in claim 13, wherein the generating includes generating, by the processing system, an output data message indicating a probability of execution for one of the data transaction objects at the future execution time as a real time response to receiving the one data transaction object from a source node.

17. The method in claim 13, wherein the output data messages are generated, by the processing system, in batches with each batch indicating probabilities of execution for multiple ones of the data transaction objects at the future execution time, and wherein the batches are generated periodically.

18. The method in claim 13, wherein the output data messages include fields that indicate multiple parameters and multiple conditions for each of the data transaction objects.

19. The method in claim 13, further comprising training the one or more predictive machine learning models by the processing system performing the following steps:

(g) adding a base predictive model with a further predictive model to generate a current base predictive model, wherein the further predictive model is based on errors of the current base predictive model predicting execution of the data transaction objects at the future execution time as compared to actual execution of the data transaction objects at the future execution time, and (h) repeating step (g).

20. The method in claim 19, wherein step (g) is repeated, by the processing system, until the errors are below a predetermined error threshold, the number of iterations reach a predetermined number, or a decrease in the errors for a current repetition as compared to the errors for one or more prior repetitions is less than a threshold.

21. A non-transitory, computer-readable medium encoded with instructions that, when executed by at least one hardware processor in a distributed computer system, cause the at least one hardware processor to receive over a data communications network different types of input data and data transaction objects from multiple source nodes communicating with the data communications network and to perform operations comprising:

(a) processing the different types of input data and the data transaction objects to generate an input data structure for each of the data transaction objects;

(b) based on the input data structure, predicting, using one or more predictive machine learning models, a probability of execution of each of the data transaction objects at a future execution time;

(c) using the predicted probability of execution of each of the data transaction objects to optimize allocation of computer and data communication resources including allocating computer and data communication resources for data transaction objects that have a predicted probability of execution at the future execution time that equals or exceeds a predetermined probability threshold and avoiding allocating computer and data communication resources for data transaction objects that have a predicted probability of execution at the future execution time that is less than the predetermined probability threshold;

(d) generating output data messages for transmission by the transceiver over the data communications network indicating the probability of execution for at least one of the data transaction objects at the future execution time;

(e) monitoring and identifying changes that affect the data transaction objects; and (f) adapting the allocation of computer and data communication resources for data transaction objects based on the changes to reduce an amount of data communicated over data communication networks, lower consumption of other computer system resources, and improve performance of the computer system.

* * * * *